US007761552B2

(12) United States Patent
Nakamura et al.

(10) Patent No.: US 7,761,552 B2
(45) Date of Patent: Jul. 20, 2010

(54) ROOT NODE FOR INTEGRATING NAS OF DIFFERENT USER NAME SPACES

(75) Inventors: Takaki Nakamura, Ebina (JP); Yasuo Yamasaki, Kodaira (JP); Hitoshi Kamei, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 262 days.

(21) Appl. No.: 12/017,655

(22) Filed: Jan. 22, 2008

(65) Prior Publication Data

US 2009/0077201 A1 Mar. 19, 2009

(30) Foreign Application Priority Data

Sep. 18, 2007 (JP) .............. 2007-241068

(51) Int. Cl.
*G06F 15/173* (2006.01)
(52) U.S. Cl. ............... 709/223; 709/220; 709/229; 726/6
(58) Field of Classification Search ........... 709/217, 709/219, 245, 220–224, 229; 726/6
See application file for complete search history.

(56) References Cited

U.S. PATENT DOCUMENTS

| 6,892,245 | B1* | 5/2005 | Crump et al. ............ 709/245 |
| 7,085,813 | B2* | 8/2006 | Huh et al. ............... 709/207 |
| 2003/0074580 | A1* | 4/2003 | Knouse et al. ............ 713/201 |
| 2003/0097454 | A1 | 5/2003 | Yamakawa et al. |
| 2004/0068584 | A1* | 4/2004 | Costa-Requena et al. ... 709/246 |
| 2006/0206928 | A1 | 9/2006 | Kamei et al. |

FOREIGN PATENT DOCUMENTS

| JP | 2003-203029 | 7/2003 |
| JP | 2006-252085 | 9/2006 |

OTHER PUBLICATIONS

"Proceedings of the FREENIX Track: 2002 USENIX Annual Technical Conference" 2002 USENIX Association.

* cited by examiner

*Primary Examiner*—Salad Abdullahi
(74) *Attorney, Agent, or Firm*—Brundidge & Stanger, P.C.

(57) ABSTRACT

A computer apparatus which integrates at least two or more services of user management domains has a processor, a memory and an interface. The processor receives an access request, specifies an access source domain, specifies an access target domain, and judges whether the specified access source domain matches the specified access target domain. If the access source domain is different from the access target domain, the processor extracts a user ID of the specified access source domain from the received access request, and refers to ID conversion information indicating correspondence of user IDs between the user management domains whose services are integrated to convert the extracted user ID of the access source domain into a user ID of the specified access target domain. Thus, loads of configuration at the time of service integration are reduced.

18 Claims, 27 Drawing Sheets

401

```
SHARE CONFIGURATION INFORMATION (/etc/exports)

PUBLIC DIRECTORY PATH  : PUBLIC CLIENT  : ORIGINAL DOMAIN ID
/mnt/FSA1C/share1      : *              : domain_a.com
/mnt/FSA1C/share2      : *              : domain_a.com
/mnt/FSA2C             : *              : domain_a.com
/mnt/FSA3C             : *              : domain_a.com
/mnt/FSB1C             : *              : domain_b.com
```

```
USER GROUP ID USED/UNUSED INFORMATION

DOMAIN ID       : USED UID/GID   : UNUSED UID/GID
domain_a.com    : UID 101-200    : UID 202-500
domain_b.com    : UID 101-150    : UID 153-600
```

USER GROUP ID MAPPING INFORMATION

| domain_a.com | : domain_b.com | : STATUS | : MANAGEMENT SERVER REFLECTION FLAG |
|---|---|---|---|
| UID 101 | : UID 151 | : PERMANENT | : REFLECTED |
| UID 102 | : UID 152 | : PERMANENT | : UNREFLECTED |
| UID 201 | : UID 101 | : TEMPORARY | : UNREFLECTED |

USER MANAGEMENT DOMAIN INFORMATION

| DOMAIN ID | : IP ADDRESS |
|---|---|
| domain_a.com | : 192.168.2.* |
| domain_b.com | : 192.168.3.* |

SHARE CONFIGURATION INFORMATION (/etc/exports)

| PUBLIC DIRECTORY PATH | : PUBLIC CLIENT | : SHARE ID |
|---|---|---|
| /gnsroot | : * | : 0 |
| /gnsroot/FSA1/share1 | : * | : 1 |
| /gnsroot/FSA1/share2 | : * | : 2 |
| /gnsroot/FSA2 | : * | : 3 |
| /gnsroot/FSA3 | : * | : 4 |
| /gnsroot/FSB1 | : * | : 5 |
| /gnsroot/FSB2 | : * | : 6 |

SWITCH MANAGEMENT INFORMATION

| SHARE ID | : DEVICE ID | : ALGORITHM ID |
|---|---|---|
| 1 | : NASA1 | : 0 |
| 2 | : NASA1 | : 0 |
| 3 | : NASA1 | : 0 |
| 4 | : NASA2 | : 1 |
| 5 | : NASB2 | : 1 |
| OTHERS | : ROOT NODE B | : 0 |

DEVICE DOMAIN INFORMATION

| DEVICE ID | : DOMAIN ID |
|---|---|
| NASA1 | : domain_a.com |
| NASA2 | : domain_a.com |
| NASB2 | : domain_b.com |
| ROOT NODE A | : domain_a.com |
| ROOT NODE B | : doamin_b.com |

ROOT NODE FOR INTEGRATING NAS OF DIFFERENT USER NAME SPACES

CLAIM OF PRIORITY

The present application claims priority from Japanese patent application JP 2007-241068 filed on Sep. 18, 2007, the content of which is hereby incorporated by reference into this application.

BACKGROUND

This invention relates to a computer apparatus which includes a processor, a memory, and an interface, and more particularly, to a technology of integrating at least two or more services of user management domains as user management units.

A network attached storage (NAS) and a file server are apparatuses for providing file share services to a client computer via a network.

The NAS or the file server has conventionally been installed in each department to be operated. In this case, user management may be independently carried out for each department.

In this description, a user management unit will be referred to as user management domain. Also, a server that carries out user management will be referred to as user management server. For example, the user management server is a network information service (NIS) server, a domain name service (DNS) server, an active directory (AD) server, or Kerberos server.

An integration of the departments may necessitate integration of NAS' whose user management domains are different from one another. As a method of integrating NAS' or file servers, the following two methods are known.

The first integration method is disclosed in JP 2006-252085 A. According to this first integration method, a plurality of user management servers are integrated into one. In addition, file servers hold correspondence between user IDs managed by the plurality of user management servers before the integration and a user ID managed by one user management server after the integration for each file system. Accordingly, the file servers can be integrated.

The second integration method is disclosed in USENIX Annual Technical Conference, Jun. 10-15, 2002 Enhancing NFS Cross-Administrative Domain Access. According to the second integration method, integration of a plurality of file servers is realized without integrating a plurality of user management servers. First, an operated volume is migrated to a NAS after integration. Then, the NAS after the integration stores share configuration information. The share configuration information manages a user ID conversion method for each file or file share service.

Moreover, a technology called a global name space (GNS) is known. According to the GNS, a plurality of file share services provided by a plurality of NAS' are provided as a virtual single file share service. According to the GNS, because the number of mounting times of a client computer can be reduced, operation costs of the client computer can be curbed.

A technology disclosed in JP 2003-203029 A realizes a GNS by using a root node present between a client and a server (hereinafter, simply referred to as root node). However, the technology disclosed in JP 2003-203029 A is based on the premise that user management domains are the same.

In the integration method disclosed in JP 2006-252085 A, the user management servers need to be integrated. Thus, there is a problem of a large influence on the existing environment. Besides, data needs to be migrated from the file server before the integration to the file server after the integration.

In the integration method disclosed in USENIX Annual Technical Conference, Jun. 10-15, 2002 Enhancing NFS Cross-Administrative Domain Access, while integration of the user management servers is unnecessary, data has to be migrated from the file server before the integration to the file server after the integration. Besides, configuration is extremely complex during the integration.

Specifically, file share services to be integrated have to be defined for user management domains to be integrated. In addition, a mapping table indicating the correspondence between the user ID before the integration and user ID after the integration has to be defined. The mapping table needs to include correspondence for all existing users, causing a problem of an enormous data volume. When the data volume of the mapping table is enormous, a response to the client computer drops.

The GNS technology disclosed in JP 2003-203029 A can provide file share services of the same user management domains as a single file share service without migrating any data. However, file share services of different user management domains cannot be provided as a single file share service.

SUMMARY

This invention has been made to solve the aforementioned problems, and aimed to reduce configuration burdens at the time of service integration.

According to an aspect of this invention, there is provided a computer apparatus for integrating at least two or more services of user management domains which are user management units, comprising: a processor; a memory; and an interface. The processor is configured to: receive an access request; specify a user management domain to which a request source of the received access request belongs as an access source domain; specify a user management domain to which an access target of the received access request belongs as an access target domain; judge whether the specified access source domain matches the specified access target domain; execute a process according to the received access request in the case of which the access source domain matches the access target domain; extract a user ID of the specified access source domain from the received access request in the case of which the access source domain is different from the access target domain; refer to ID conversion information indicating correspondence of user IDs between the user management domains whose services are integrated in order to convert the extracted user ID of the access source domain into a user ID of the specified access target domain; substitute the user ID included in the received access request with the converted user ID; and execute a process according to the user ID substituted access request.

According to the aspect of this invention, configuration burdens at the time of service integration can be reduced.

BRIEF DESCRIPTION OF THE DRAWINGS

The present invention can be appreciated by the description which follows in conjunction with the following figures, wherein:

FIG. 5 is a diagram illustrating a configuration of a share configuration information stored in the NAS after integration in accordance with the first embodiment of this invention;

FIG. 6 is a diagram illustrating a configuration of a user group ID used/unused information stored in the NAS after integration in accordance with the first embodiment of this invention;

FIG. 7 is a diagram illustrating a configuration of a user group ID mapping information stored in the NAS after integration in accordance with the first embodiment of this invention;

FIG. 8 is a diagram illustrating a configuration of a user management domain information stored in the NAS after integration in accordance with the first embodiment of this invention;

FIG. 27 is a diagram illustrating a configuration of a share configuration information stored in the root node in accordance with the fifth embodiment of this invention;

FIG. 28 is a diagram illustrating a configuration of a switch management information stored in the root node in accordance with the fifth embodiment of this invention;

FIG. 29 is a diagram illustrating a configuration of a device domain information stored in the root node in accordance with the fifth embodiment of this invention;

DETAILED DESCRIPTION OF THE PREFERRED EMBODIMENTS

Figure 1:
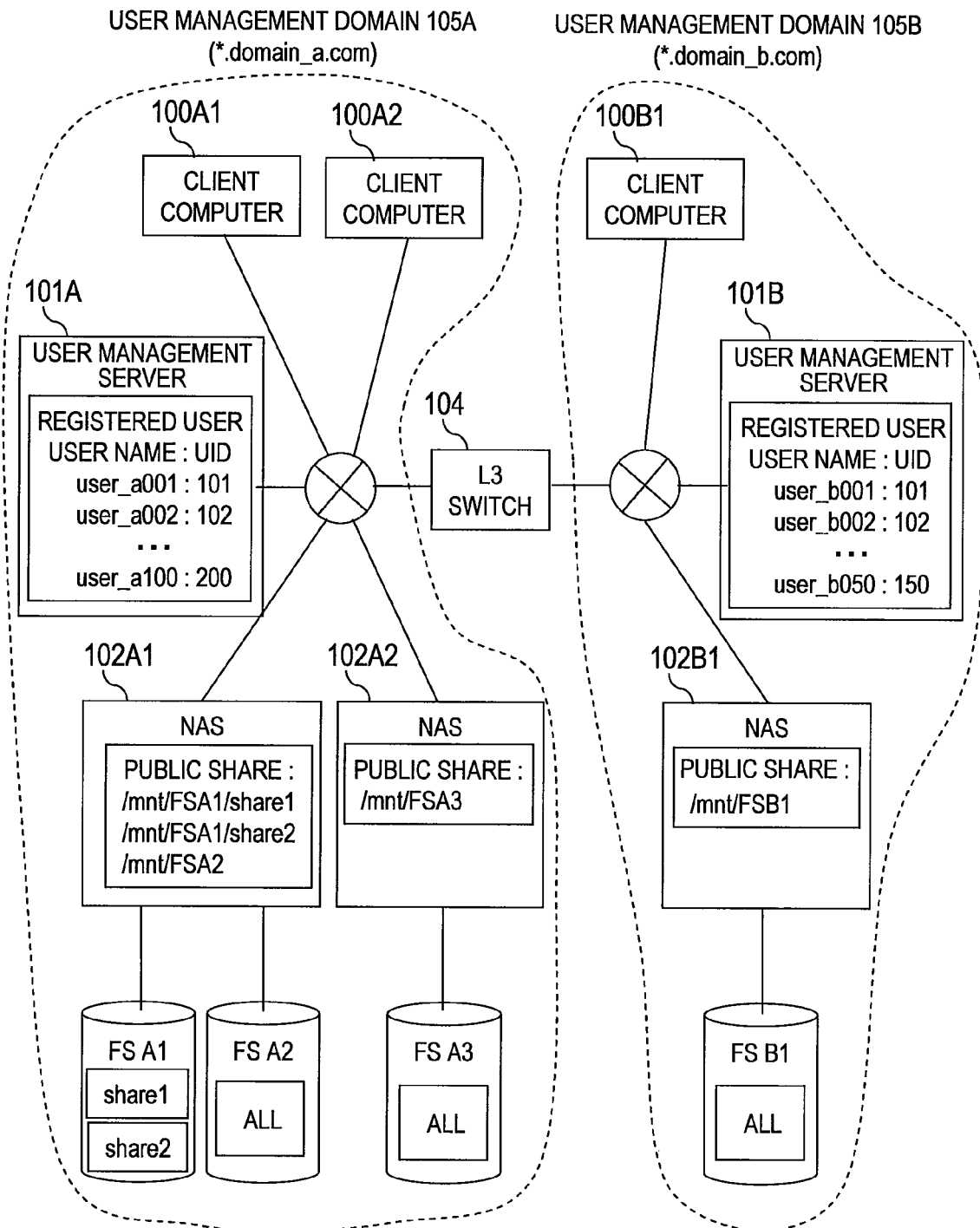
FIG. 1 is a block diagram illustrating a configuration of a computer system before integration in accordance with a first embodiment of this invention.

Referring to the drawings, the preferred embodiments of this invention will be described.

First Embodiment

FIG. 1 is a block diagram illustrating a configuration of a computer system before integration according to a first embodiment of this invention.

This block diagram illustrates the configuration of the computer system before the integration. The computer system before the integration includes a user management domain 105A, a user management domain 105B, and an L3 switch 104. The L3 switch 104 interconnects networks of the user management domains 105A and 105B.

The user management domains 105A and 105B are user management units. The user management domain 105A includes a client computer 100A1, a client computer 100A2, a user management server 101A, a NAS 102A1, and a NAS 102A2. On the other hand, the user management domain 105B includes a client computer 100B1, a user management server 101B, and a NAS 102B1.

The client computer 100 (including 100A1, 100A2, and 100B1) is a computer including a CPU, a memory, and an interface, and operated by a user. The client computer 100 receives file share services from the NAS 102 (including 102A1, 102A2, and 102B1).

The user management server 101 (including 101A and 101B) includes a CPU, a memory, and an interface, and manages the user who operates the client computer 100. Specifically, the user management server 101 stores correspondence between a user name which is a name of a user and a UID which uniquely identifies the user in the user management domain 105.

For example, the user management server 101 is a network information service (NIS) server, a domain name service (DNS) server, an active directory (AD) server, or Kerberos server.

The NAS 101 (102A1, 102A2, and 102B1) provides file share services to the client computer 100.

For example, the NAS 102 includes a NAS server and a storage system.

The NAS server provides file share services to the client computer 100. For example, the NAS server receives a file access request from the client computer 100. Then, the NAS server converts the received file access request into a block access request. Then, the NAS server transmits the converted block access request to the storage system. The storage system inputs/outputs data according to the block access request received from the NAS server. Accordingly, the storage system stores data requested to be written by the client computer 100.

The embodiment of this invention will describe a case where file share services are integrated in the computer system shown in FIG. 1. In this case, the computer system is configured as shown in FIG. 2 by integration of file share services.

Figure 2:
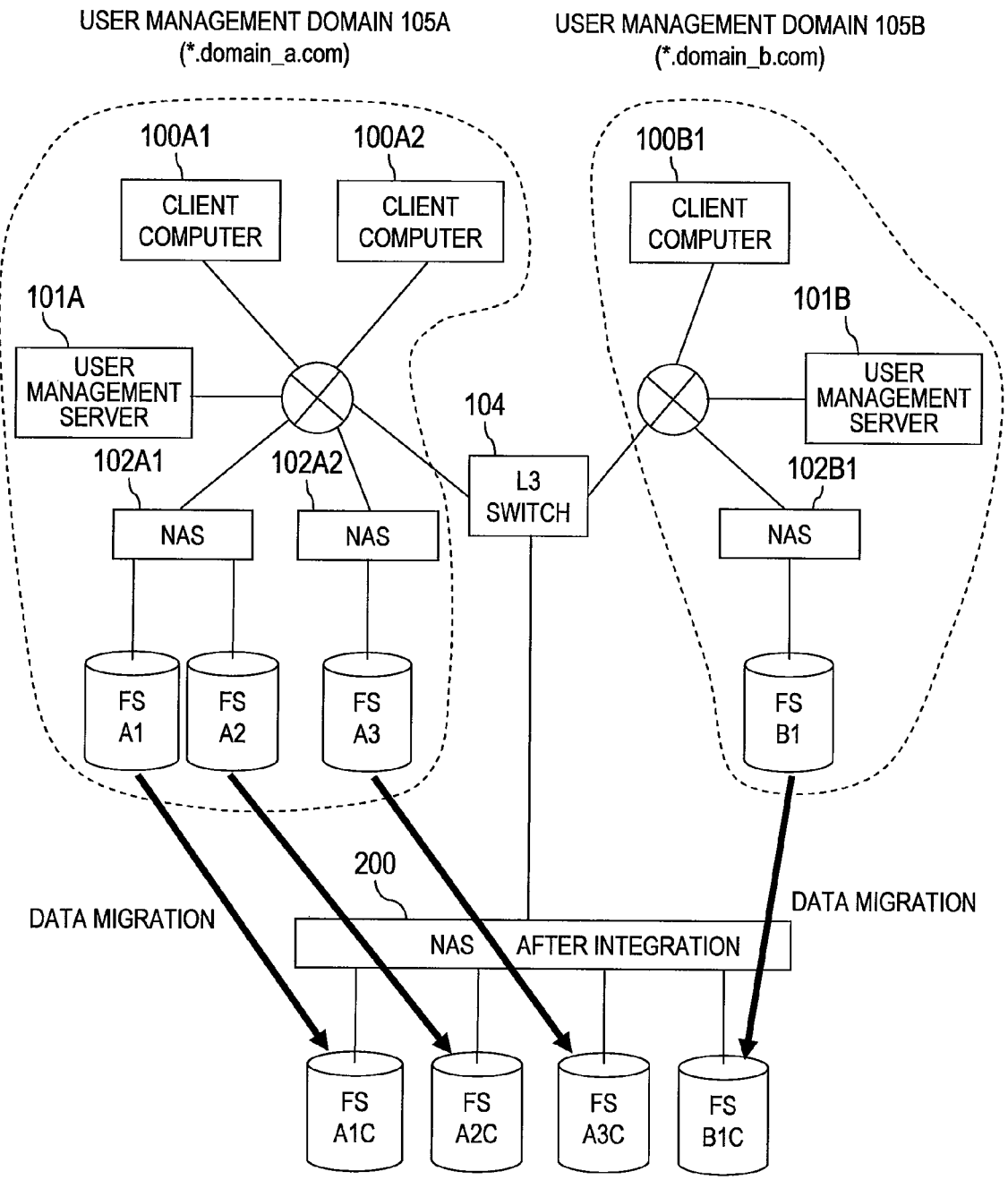
FIG. 2 is a block diagram illustrating a configuration of a computer system after integration in accordance with the first embodiment of this invention.

FIG. 2 is a block diagram illustrating a configuration of the computer system after integration according to the first embodiment of this invention.

The computer system after the integration includes the user management domain 105A, the user management domain 105B, the L3 switch 104, and a NAS 200 after integration. The L3 switch 104 interconnects networks of the user management domains 105A and 105B, and the NAS 200 after integration. The user management domains 105A and 105B are the same as those included in the computer system before the integration, and thus their description will be omitted.

The NAS 200 after integration provides file share services to the client computer 100 after the integration. Accordingly, data such as files stored in the NAS 102A1, 102A2, and 102B1 are migrated to the NAS 200 after integration. The NAS 200 after integration will be described below in detail referring to FIG. 3.

As shown in FIG. 2, the NAS 200 after integration is arranged in a user management domain different from the user management domain 105A or 105B. However, the NAS 200 after integration may be arranged in one of the user management domains 105A and 105B.

Figure 3:
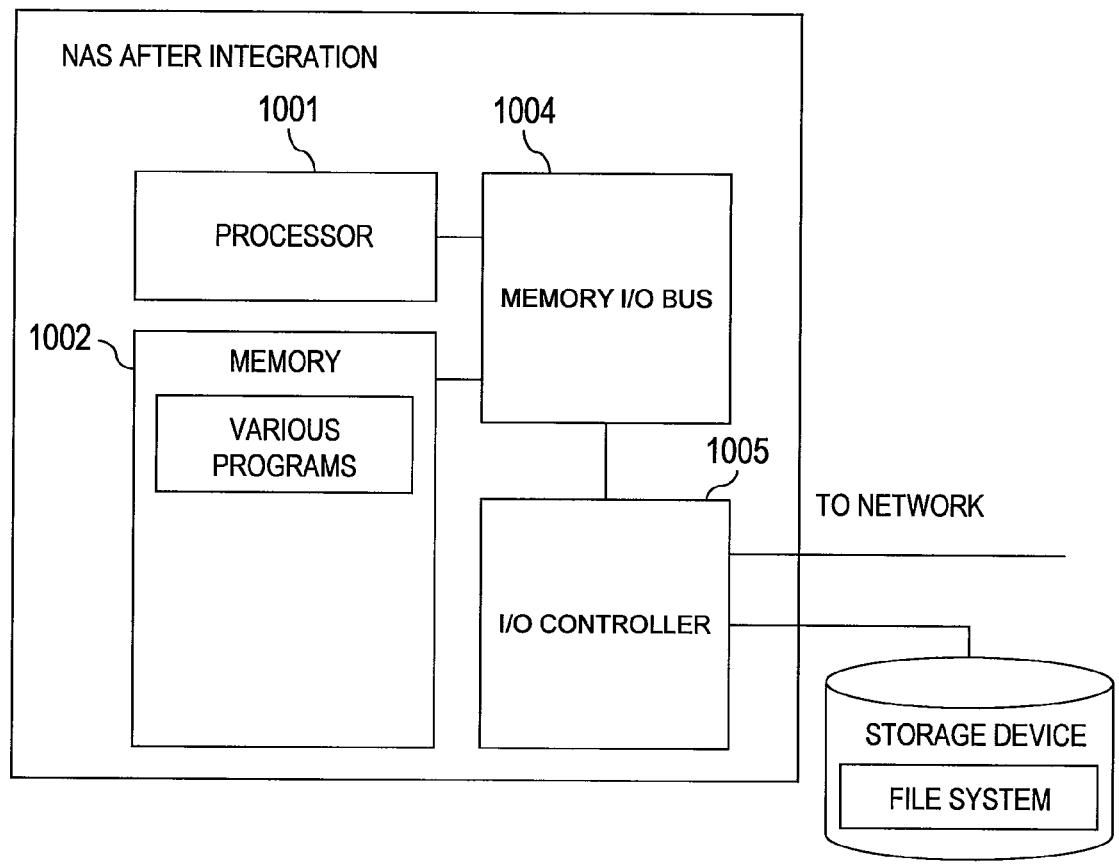
FIG. 3 is a block diagram illustrating a configuration of a NAS after integration in accordance with the first embodiment of this invention.

FIG. 3 is a block diagram illustrating a configuration of the NAS 200 after integration according to the first embodiment of this invention.

The NAS 200 after integration includes a NAS sever after integration and a storage system. The storage system stores data such as files stored in the NAS 102A1, 102A2, and 102B1.

The NAS server after integration includes a processor 1001, a memory 1002, a memory I/O bus 1004, and an I/O controller 1005.

The memory I/O bus 1004 interconnects the processor 1001, the memory 1002, and I/O controller 1005. The memory 1002 stores programs executed by the processor 1001, information needed by the processor 1001, or the like.

The processor 1001 executes the programs stored in the memory 1002 to realize various processing modules described below referring to FIG. 4.

The I/O controller 1005 is an interface for connecting the storage system with an external network.

Figure 4:
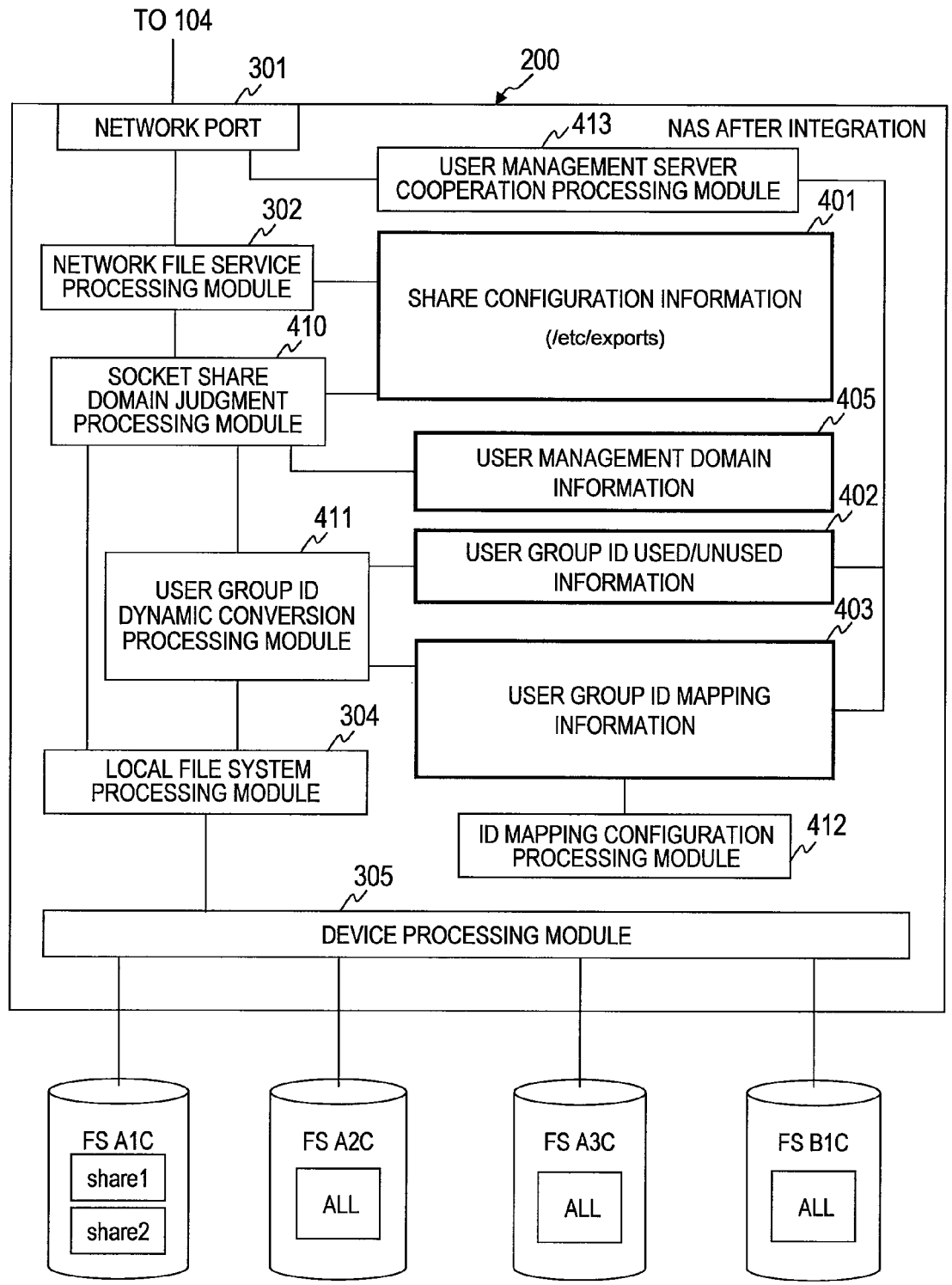
FIG. 4 is a block diagram illustrating a functional configuration of the NAS after integration in accordance with the first embodiment of this invention.

FIG. 4 is a block diagram illustrating a functional configuration of the NAS 200 after integration according to the first embodiment of this invention.

The NAS 200 after integration includes a network port 301, a network file service processing module 302, a socket share domain judgment processing module 410, a user group ID dynamic conversion processing module 411, a local file system processing module 304, a device processing module 305, an ID mapping configuration processing module 412, and a user management server association processing module 413.

The network port 301 is an interface connected to the L3 switch 104. The network port 301 receives a file access request from the client computer 100. Then, the network port 301 transmits a reply corresponding to the received file access request to the client computer 100. The network port 301 is disposed in the I/O controller 1005.

The network file service processing module 302, the socket share domain judgment processing module 410, the user group ID dynamic conversion processing module 411, the local file system processing module 304, the device processing module 305, the ID mapping configuration processing module 412, and the user management server association processing module 413 are realized by execution of the programs stored in the memory 1002 by the processor 1001.

The NAS 200 after integration stores share configuration information 401, user group used/unused information 402, user group ID mapping information 403, and user management domain information 405.

The share configuration information 401 is information regarding a file share service. The share configuration information 401 will be described below in detail referring to FIG. 5.

The user group ID used/unused information 402 indicates use statuses of a UID as a unique identifier of a user and a GID as an identifier of a group to which the user belongs. Any type of UID may be used as long as it can identify a group. Any type of GID may be used as long as it can identify a group. The user group ID used/unused information 402 will be described below in detail referring to FIG. 6.

The user group ID mapping information 403 indicates correspondence of UID and GID between different user management domains 105. The user group ID mapping information 403 will be described below in detail referring to FIG. 7.

The user management domain information 405 indicates correspondence between the user management domain 105 and an IP address of the client computer 100 belonging to the user management domain 105. The user management domain information 405 will be described below in detail referring to FIG. 8.

FIG. 5 illustrates a configuration of the share configuration information 401 stored in the NAS 200 after integration according to the first embodiment of this invention.

The share configuration information 401 contains a public directory path 4011, a public client 4012, and a source domain ID 4013.

The public directory path 4011 is a directly path made pubic to the client computer 100. The directory path indicates a position of storing a file or the like.

The public client 4012 indicates a client computer 100 which becomes a public target of the public directory path

4011 of a relevant record. The source domain ID 4013 is a unique identifier of the user management domain 105 to which the public directory path 4011 of the record belongs before integration.

Any type of domain ID may be used as long as it is information to be specified by the user management domain 105. For example, the domain ID may be a DNS domain name, a NIS domain name, an NT domain name, a DNS server name, a NIS server name, or an AD server name. The domain ID may be a unique value or character being valid only in the NAS 200 after integration.

FIG. 6 illustrates a configuration of the user group ID used/unused information 402 stored in the NAS 200 after integration according to the first embodiment of this invention.

The user group ID used/unused information 402 contains a domain ID 4021, a used UID/GID 4022, and an unused UID/GID 4023.

The domain ID 4021 is a unique identifier of the user management domain 105. The used UID/GID 4022 is a UID or a GID used in the user management domain 105 identified by the domain ID 4021 of the record. The UID is a unique identifier of a user, and the GID is a unique identifier of a group to which the user belongs.

The unused UID/GID 4023 is a UID or a GID unused in the user management domain 105 identified by the domain ID 4021 of the record. The unused UID/GID 4023 may be all UIDs/GIDs other than the used UID/GID 4022, or some UIDs/GIDs other than the used UID/GID 4022. While not used at present, the latter will be used in a case of reserving a UID/GID likely to be used in the user management domain in the future.

The used UID/GID 4022 and the unused UID/GID 4023 may be managed in list forms or forms indicating ID ranges.

Any type of user group ID used/unused information 402 may be used as long as it indicates a use status of a UID/GID in each user management domain 105.

FIG. 7 illustrates a configuration of the user group ID mapping information 403 stored in the NAS 200 after integration according to the first embodiment of this invention.

The user group ID mapping information 403 contains a UID/GID 4031 in the user management domain 105A, a UID/GID 4032 in the user management domain 105B, a status 4033, and a management server reflection flag 4034.

The UID/GID 4031 in the user management domain 105A is a unique identifier of a user or a group in the user management domain 105A. The UID/GID 4032 in the user management domain 105B is an identifier for identifying the user or the group identified by the UID/GID 4031 in the user management domain 105A of the record in the user management domain 105B.

The status 4033 indicates whether correspondence between the UID/GID 4031 in the user management domain 105A of the record and the UID/GID 4032 in the user management domain 105B is permanent.

Information of the record indicated to be permanent by the status 4033 is stored not only in the memory 1002 but also in the storage system. Accordingly, the information of the record indicated to be permanent by the status 4033 is not lost even when the NAS 200 after integration is started again. On the other hand, information of the record indicated not to be permanent (temporary) by the status 4033 is stored only in the memory 1002. Thus, the information of the record indicated to be temporary by the status 4033 is lost when the NAS 200 after integration is started again.

The management server reflection flag 4034 indicates whether correspondence between the UID/GID 4031 in the user management domain 105A of the record and the UID/GID 4032 in the user management domain 105B is reflected (has been reflected) in the user management server 101.

FIG. 8 illustrates a configuration of the user management domain information 405 stored in the NAS 200 after integration according to the first embodiment of this invention.

The user management domain information 405 contains a domain ID 4051 and an IP address 4052. The domain ID 4051 is a unique identifier of the user management domain 105. The IP address 4052 is an IP address allocated to the client computer 100 which belongs to the user management domain 105 identified by the domain ID 4051 of the record.

Here, the explanation returns to FIG. 4. The network file service processing module 302 judges whether a file targeted for access by the file access request received by the network port 301 can be made public.

Specifically, the network file service processing module 302 extracts an access target directory path from the file access request received by the network port 301. Then, the network file service processing module 302 selects a record where the extracted directory path matches the public directory path 4011 of the share configuration information 401 from the share configuration information 401. Then, the network file service processing module 302 extracts a public client 4012 from the selected record.

Next, the network file service processing module 302 judges whether the transmission source client computer 100 of the received file access request corresponds to the extracted public client 4012.

If the transmission source client computer 100 of the file access request belongs to a relevant user management domain 105, the network file service processing module 302 judges that an access target file can be made public. Then, the network file service processing module 302 passes the file access request to the socket share domain judgment processing module 410.

On the other hand, if the transmission source client computer 100 of the file access request does not belong to the relevant user management domain 105, the network file service processing module 302 judges that the access target file cannot be made public. Then, the network file service processing module 302 notifies file access inhibition to the transmission source client computer 100 of the received file access request.

The network file service processing module 302 transmits a reply to the file access request from the network port 301 to the client computer 100.

The socket share domain judgment processing module 410 judges whether the UID and the GID need to be converted. The process executed by the socket share domain judgment processing module 410 will be described referring to FIG. 9.

The user group ID dynamic conversion processing module 411 converts the UID and the GID. The process executed by the user group ID dynamic conversion processing module 411 will be described referring to FIGS. 10 to 13.

The local file system processing module 304 converts the file access request into a block access request. The local file system processing module 304 passes the reply received from the device processing module 305 to the user group ID dynamic conversion processing module 411.

The device processing module 305 transmits the block access request converted by the local file system processing module 304 to the storage system. The device processing module 305 receives a reply to the block access request from the storage system. Then, the device processing module 305 passes the received reply to the local file system processing module 304.

The ID mapping configuration processing module 412 creates or updates user group ID mapping information 403. The process executed by the ID mapping configuration processing module 412 will be described referring to FIG. 14.

The user management server association processing module 413 executes a user group registration process and a used user group ID acquisition process. The user group registration process and the used user group ID acquisition process executed by the user management server association processing module 413 will be described referring to FIGS. 15 and 16, respectively.

Figure 9:
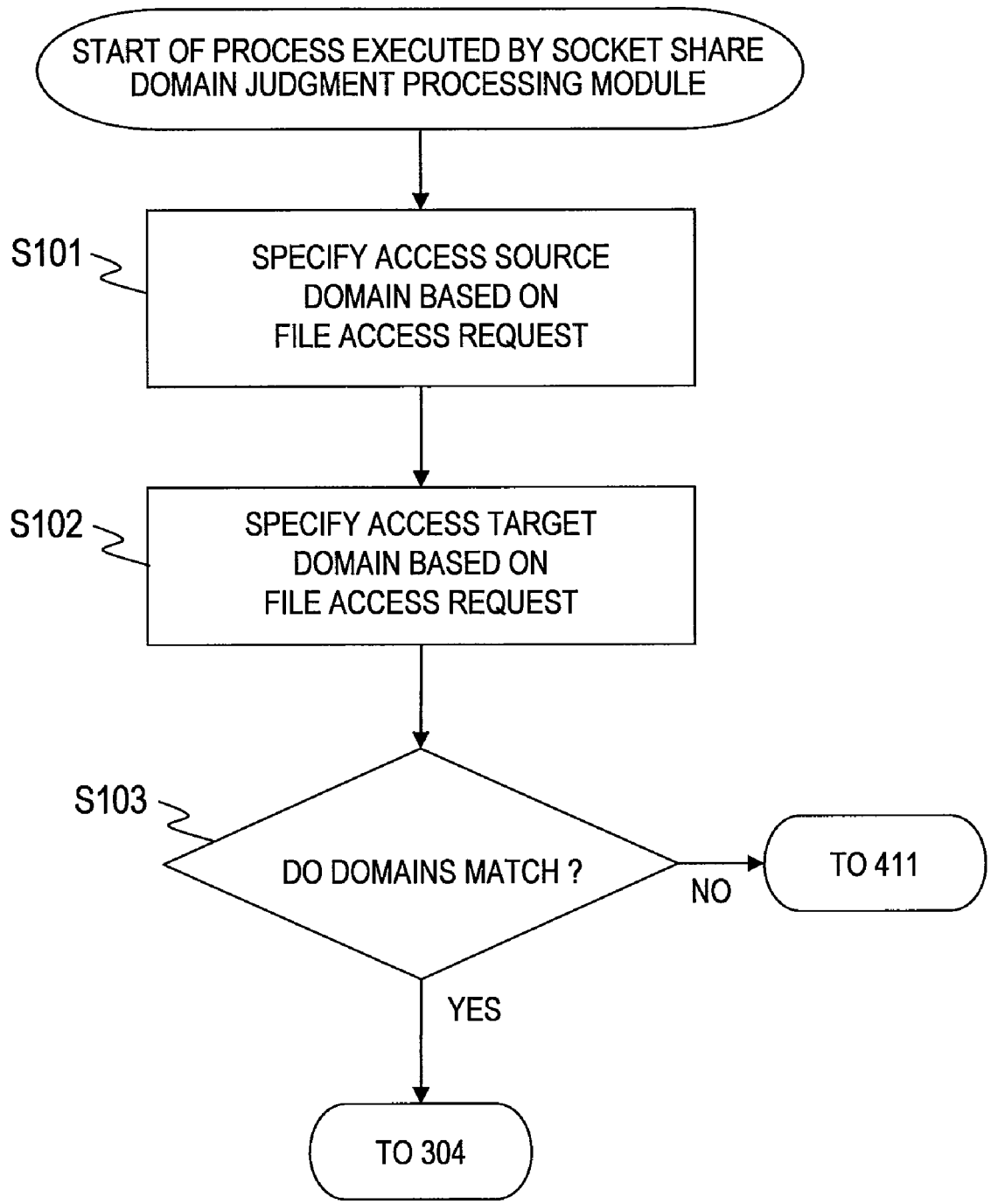
FIG. 9 is a flowchart of a process executed by a socket share domain judgment processing module in accordance with the first embodiment of this invention.

FIG. 9 is a flowchart of the process executed by the socket share domain judgment processing module 410 according to the first embodiment of this invention.

Upon reception of the file access request from the network file service processing module 302, the socket share domain judgment processing module 410 starts the process.

First, the socket share domain judgment processing module 410 specifies an access source IP address from the received file access request. In place of the IP address, another piece of information enabling specifying of the access source client computer 100 may be extracted. This information is socket information or a MAC address.

Next, the socket share domain judgment processing module 410 selects a record where the specified IP address matches the IP address 4052 of the user management domain information 405 from the user management domain information 405. The socket share domain judgment processing module 410 extracts a domain ID 4051 from the selected record. The socket share domain judgment processing module 410 specifies a user management domain 105 identified by the extracted domain ID 4051 as an access source domain (S101).

The socket share domain judgment processing module 410 extracts a file handle identifying an access target file from the received file access request. The socket share domain judgment processing module 410 converts the extracted file handle into an access target path.

The socket share domain judgment processing module 410 selects a record where a part or all of the path created by the conversion match the public directory path 4011 of the share configuration information 401 from the share configuration information 401.

The socket share domain judgment processing module 410 extracts a source domain ID 4013 from the selected record. The socket share domain judgment processing module 410 specifies a user management domain 105 identified by the extracted source domain ID 4013 as an access target domain (S102).

The socket share domain judgment processing module 410 judges whether the extracted domain ID 4051 matches the extracted source domain ID 4013. Accordingly, the socket share domain judgment processing module 410 judges whether the specified access source domain matches the access target domain (S103).

If the domain ID 4051 matches the source domain ID 4013, the access source domain matches the access target domain. In this case, the UID and the GID do not need to be converted. Thus, the socket share domain judgment processing module 410 passes the received file access request to the local file system processing module 304. Then, the socket share domain judgment processing module 410 finishes the process.

On the other hand, if the domain ID 4051 does not match the source domain ID 4013, the access source domain does not match the access target domain. In this case, the UID and the GID need to be converted. Accordingly, the socket share domain judgment processing module 410 passes the received file access request to the user group ID dynamic conversion processing module 411. Then, the socket share domain judgment module 410 finishes the process.

Figure 10:
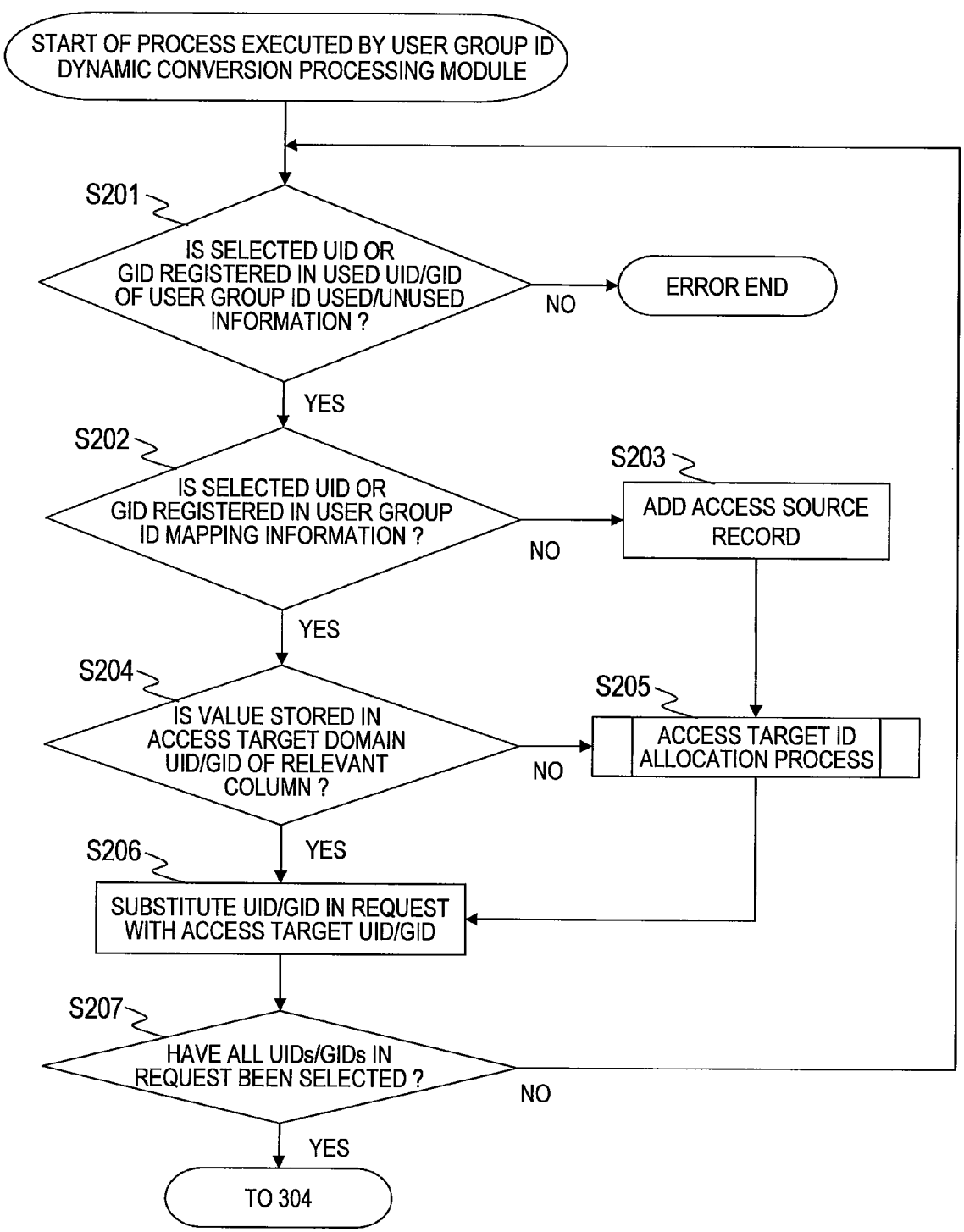
FIG. 10 is a flowchart of a process executed by a user group ID dynamic conversion processing module in accordance with the first embodiment of this invention.

FIG. 10 is a flowchart of the process executed by the user group ID dynamic conversion processing module 411 according to the first embodiment of this invention.

Upon reception of the file access request from the socket share domain judgment processing module 410, the user group ID dynamic conversion processing module 411 starts the process.

First, the user group ID dynamic conversion processing module 411 sequentially selects the UID or the GID contained in the received file access request one by one. Then, the user group ID dynamic conversion process module 411 executes the following process for each selected UID or GID.

The user group ID dynamic conversion processing module 411 extracts the access source IP address from the received file access request.

The user group ID dynamic conversion processing module 411 selects a record where the extracted domain ID 4051 matches the domain ID 4021 of the user group ID used/unused information 402 from the user group ID used/unused information 402. Then, the user group ID dynamic conversion processing module 411 judges whether the selected UID or GID is included in the used UID/GID 4022 of the selected record (S201).

If the selected UID or GID is not included in the used UID/GID 4022 of the selected record, the user group ID dynamic conversion processing module 411 notifies an error to the client computer 100 or the like. Then, the user group ID dynamic conversion processing module 411 finishes the process.

On the other hand, if the selected UID or GID is included in the used UID/GID 4022 of the selected record, the user group ID dynamic conversion processing module 411 selects a column corresponding to the extracted domain ID 4051 from the user group ID mapping information 403.

The user group ID dynamic conversion processing module 411 judges which one of records included in the selected column the selected UID or GID is stored in (S202).

If the selected UID or GID is not stored in any one of the records included in the selected column, the user group ID dynamic conversion processing module 411 creates a new record in the user group ID mapping information 403. Then, the user group ID dynamic conversion processing module 411 selects a column (box) corresponding to the extracted domain ID 4051 from the new record. Then, the user group ID dynamic conversion processing module 411 stores the selected UID or GID in the selected box (S203).

In the step S203, no UID or GID is stored in a column corresponding to the user management domain 105 other than the access source.

It should be noted that the user group ID dynamic conversion processing module 411 may store a relevant UID or GID not only in the column corresponding to the access source user management domain 105 but also in the column corresponding to the user management domain 105 other than the access source. In this case, the user group ID dynamic conversion processing module 411 executes a process similar to an access target ID allocation process (S205) not only for the column corresponding to the access target user management domain 105 but also for all the columns corresponding to the user management domain 105 other than the access source.

The user group ID dynamic conversion processing module 411 proceeds to the step S205 to execute the access target ID allocation process. The access target ID allocation process will be described below in detail referring to FIG. 11.

On the other hand, if the selected UID or GID is stored in one of the records included in the selected column, the user group ID dynamic conversion processing module 411 selects the record from the user group ID mapping information 403.

The user group ID dynamic conversion processing module 411 selects a column (box) corresponding to the extracted source domain ID 4013 from the record selected from the user group ID mapping information 403. Then, the user group ID dynamic conversion processing module 411 judges whether a UID or a GID is stored in the selected box (S204).

If neither a UID nor a GID is stored in the box, the user group ID dynamic conversion processing module 411 proceeds to step S205 to execute an access target ID allocation process. The access target ID allocation process will be described below in detail referring to FIG. 11.

On the other hand, if one of a UID and a GID is stored in the box, the user group ID dynamic conversion processing module 411 extracts a UID or a GID from the box.

The user group ID dynamic conversion processing module 411 substitutes the selected UID or GID with the extracted UID or GID (step S206). In other words, the user group ID dynamic conversion processing module 411 substitutes the UID or the GID (included in the file access request) in the access source user management domain 105 with a UID or GID in the access target user management domain 105.

The user group ID dynamic conversion processing module 411 judges whether all the UIDs and GIDs included in the received file access request have been selected in step S201 (step S207).

If any one of the UIDs or the GIDs included in the received file access request has not been selected, the user group ID dynamic conversion processing module 411 returns to the step S201. Then, the user group ID dynamic conversion processing module 411 selects a UID or a GID included in the received file access request but unselected to repeat the process.

On the other hand, if all the UIDs and the GIDs included in the received file access request have been selected, the user group ID dynamic conversion processing module 411 passes the file access request to the local file system processing module 304. Then, the user group ID dynamic conversion processing module 411 finishes the process.

Figure 11:
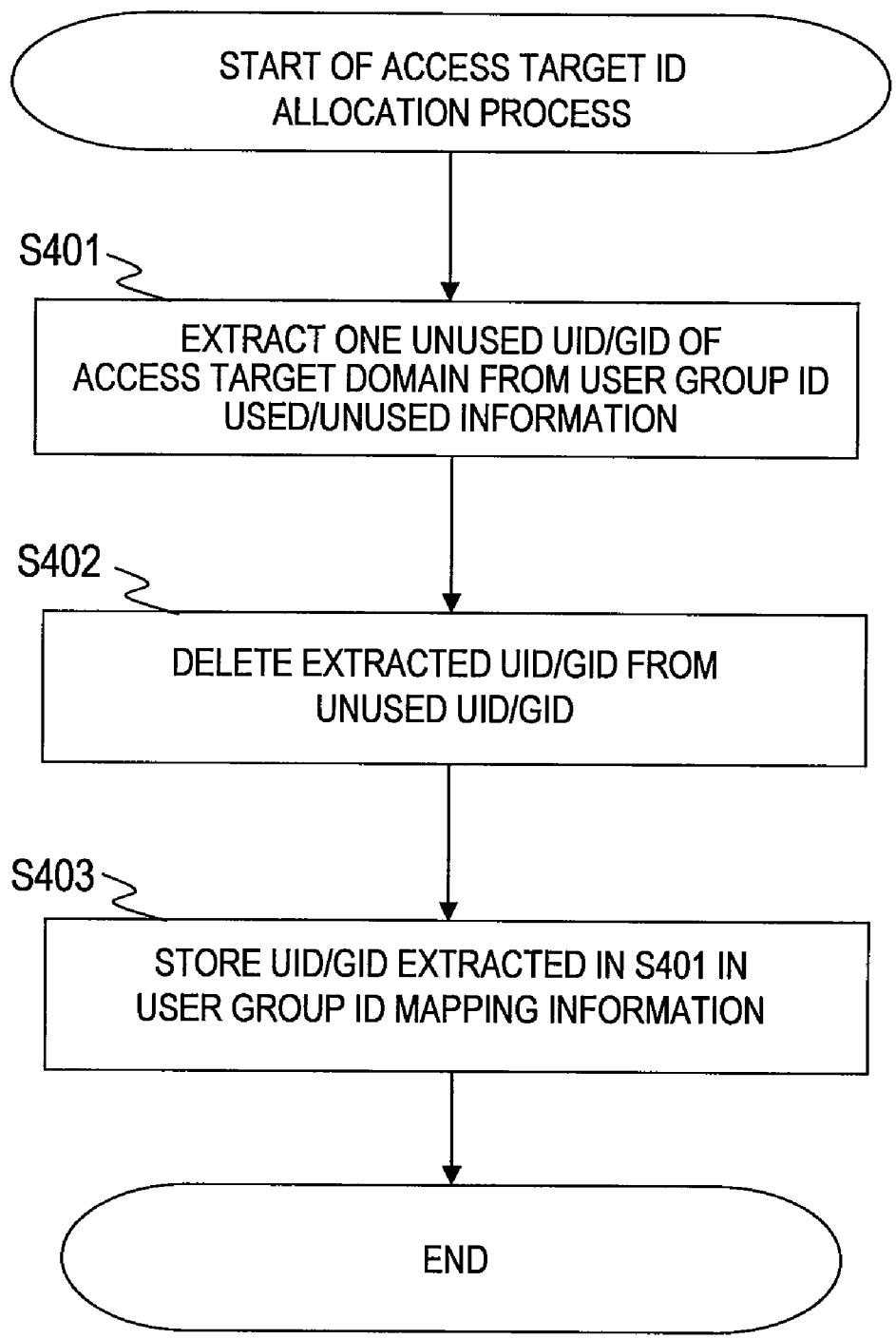
FIG. 11 is a flowchart of an access target ID allocation process executed by the user group ID dynamic conversion processing module in accordance with the first embodiment of this invention.

FIG. 11 is a flowchart of the access target ID allocation process executed by the user group ID dynamic conversion processing module 411 according to the first embodiment of this invention.

The access target ID allocation process is executed in the step S205 of the process executed by the user group ID dynamic conversion processing module 411 shown in FIG. 10.

The user group ID dynamic conversion processing module 411 selects a record where the extracted source domain ID 4013 matches the domain ID 4021 of the user group ID used/unused information 402 from the user group ID used/unused information 402. The user group ID dynamic conversion processing module 411 extracts one of UIDs or GIDs stored in the unused UID/GID 4023 of the selected record (S401).

The user group ID dynamic conversion processing module 411 deletes the extracted UID or GID from the unused UID/GID 4023 of the selected record (S402).

The user group ID dynamic conversion processing module 411 stores the extracted UID or GID in the box included in the new record added in the step S203 and corresponding to the extracted source domain ID 4013 or the box selected in the step S204 (S403).

The user group ID dynamic conversion processing module 411 stores information indicating nonreflection in the management reflection flag 4034 of the record including the box in which the UID or the GID has been stored.

The user group ID dynamic conversion processing module 411 judges whether the received file access request is for requesting a process regarding updating of the user ID. The process regarding the updating of the user ID is a new file creation process, a file owner user changing process, a file owner group changing process, or the like.

If the file access request is for requesting the process regarding the updating of the user ID, the user group ID dynamic conversion processing module 411 stores information indicating that correspondence is permanent in the status 4033 of the record including the box in which the UID or the GID has been stored.

On the other hand, if the file access request is not for requesting the process regarding the updating of the user ID (but for requesting writing or reading), the user group ID dynamic conversion processing module 411 stores information indicating that correspondence is not permanent (correspondence is temporary) in the status 4033 of the record including the box in which the UID or the GID has been stored. In this case, however, the user group ID dynamic conversion processing module 411 may store not the information indicating that the correspondence is temporary but the information indicating that the correspondence is permanent in the status 4033 of the record including the box in which the UID or the GID has been stored.

Then, the user group ID dynamic conversion processing module 411 finishes the access target ID allocation process.

Figure 12:
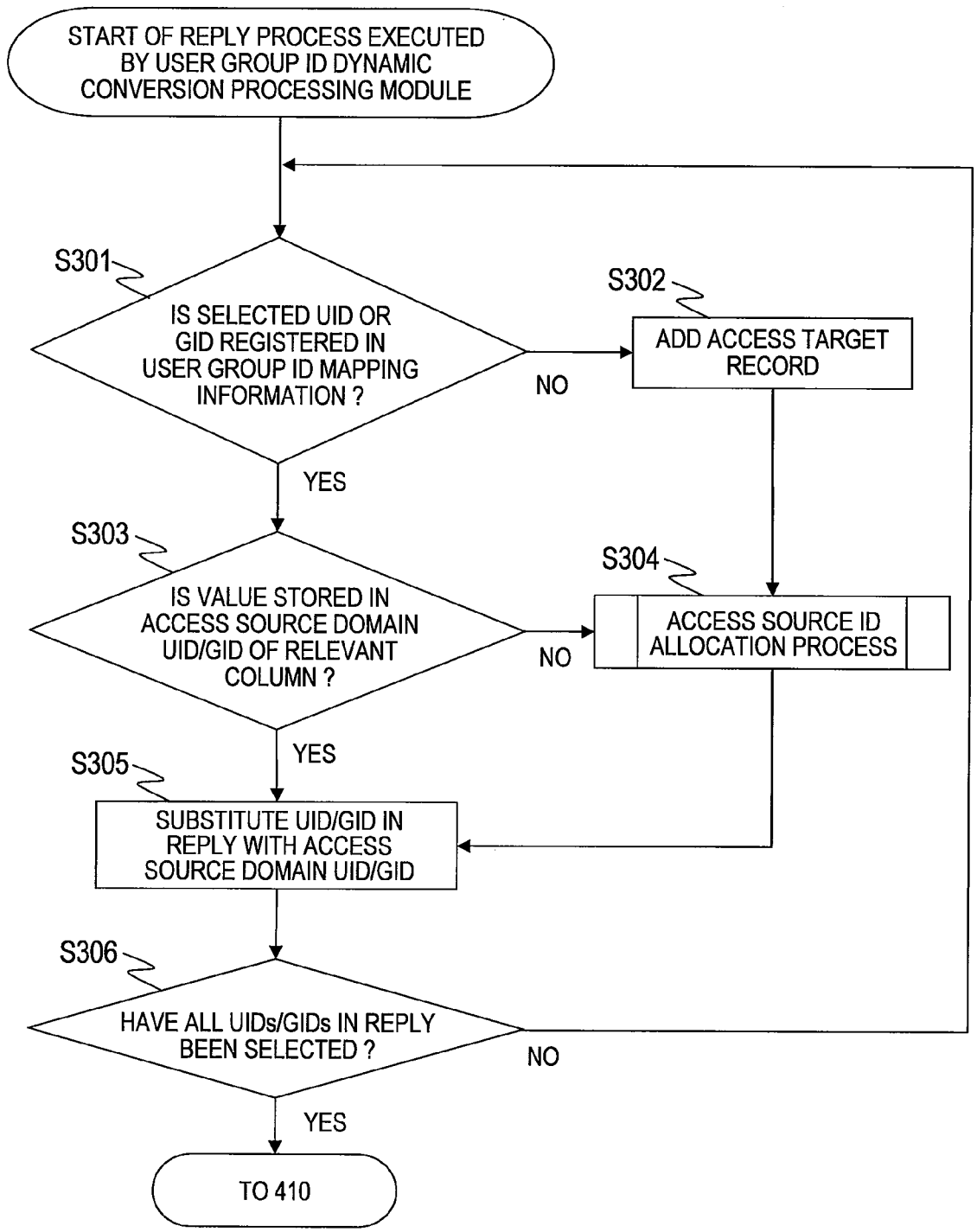
FIG. 12 is a flowchart of a reply process executed by the user group ID dynamic conversion processing module in accordance with the first embodiment of this invention.

FIG. 12 is a flowchart of the reply process executed by the user group ID dynamic conversion processing module 411 according to the first embodiment of this invention.

Upon reception of a reply from the local file system processing module 304, the user group ID dynamic conversion processing module 411 starts the reply process.

First, the user group ID dynamic conversion processing module 411 sequentially selects UIDs or GIDs included in the received reply one by one. Then, the user group ID dynamic conversion processing module 411 executes the following process for each of the selected UIDs or GIDs.

The user group ID dynamic conversion processing module 411 specifies a domain ID of the access source user management domain 105 and a domain ID of the access target user management domain 105 based on the received reply.

The user group ID dynamic conversion processing module 411 selects a column corresponding to the domain ID of the specified access target user management domain 105 from the user group ID mapping information 403.

The user group ID dynamic conversion processing module 411 judges whether the selected UID or GID has been stored in any one of records included in the selected column (S301).

If the selected UID or GID has not been stored in any one of the records included in the selected column, the user group ID dynamic conversion processing module 411 creates a new record in the user group ID mapping information 403. The user group ID dynamic conversion processing module 411 selects a column (box) corresponding to the domain ID of the specified access target user management domain 105 from the new record. The user group ID dynamic conversion processing module 411 stores the selected UID or GID in the selected box (S302).

In the step S302, no UID or GID is stored in a column corresponding to a user management domain 105 other than that of the access target.

However, the user group ID dynamic conversion processing module 411 may store a relevant UID or GID not only in the column corresponding to the access target user management domain 105 but also in the column corresponding to the user management domain 105 other than that of the access target. In this case, the user group ID dynamic conversion processing module 411 executes a process similar to the access source ID allocation process (S304) not only for the column corresponding to the access source user management domain 105 but also for all the columns corresponding to the user management domain 105 other than that of the access target.

Then, the user group ID dynamic conversion processing module 411 proceeds to the step S304 to execute an access source ID allocation process. The access source ID allocation process will be described below in detail referring to FIG. 13.

On the other hand, if the selected UID or GID has been stored in one of the records included in the selected column, the user group ID dynamic conversion processing module 411 selects the record from the user group ID mapping information 403.

The user group ID dynamic conversion processing module 411 selects a column (box) corresponding to the domain ID of the specified access source user management domain 105 from the record selected from the user group ID mapping information 403. The user group ID dynamic conversion processing module 411 judges whether a UID or a GID has been stored in the selected box (S303).

If neither a UID nor a GID has been stored in the box, the user group ID dynamic conversion processing module 411 proceeds to the step S304 to execute the access source ID allocation process. The access source ID allocation process will be described below in detail referring to FIG. 13.

On the other hand, if a UID or a GID has been stored in the box, the user group ID dynamic conversion processing module 411 extracts the UID or the GID from the box.

The user group ID dynamic conversion processing module 411 substitutes the selected UID or GID with the extracted UID or GID (S305). In other words, the user group ID dynamic conversion processing module 411 substitutes the UID or the GID (included in the reply) in the access target user management domain 105 with the UID or the GID in the access source user management domain.

The user group ID dynamic conversion processing module 411 judges whether all the UIDs and the GIDs included in the received reply have been selected in the step S301 (S306).

If any one of the UIDs or the GIDs included in the received reply has not been selected, the user group ID dynamic conversion processing module 411 returns to the step S301. Then, the user group ID dynamic conversion processing module 411 selects a UID or a GID included in the received reply but not selected to repeat the process.

On the other hand, if all the UIDs and the GIDs included in the received reply are selected, the user group ID dynamic conversion processing module 411 passes the reply to the socket share domain judgment processing module 410. Then, the user group ID dynamic conversion processing module 411 finishes the reply process.

Figure 13:
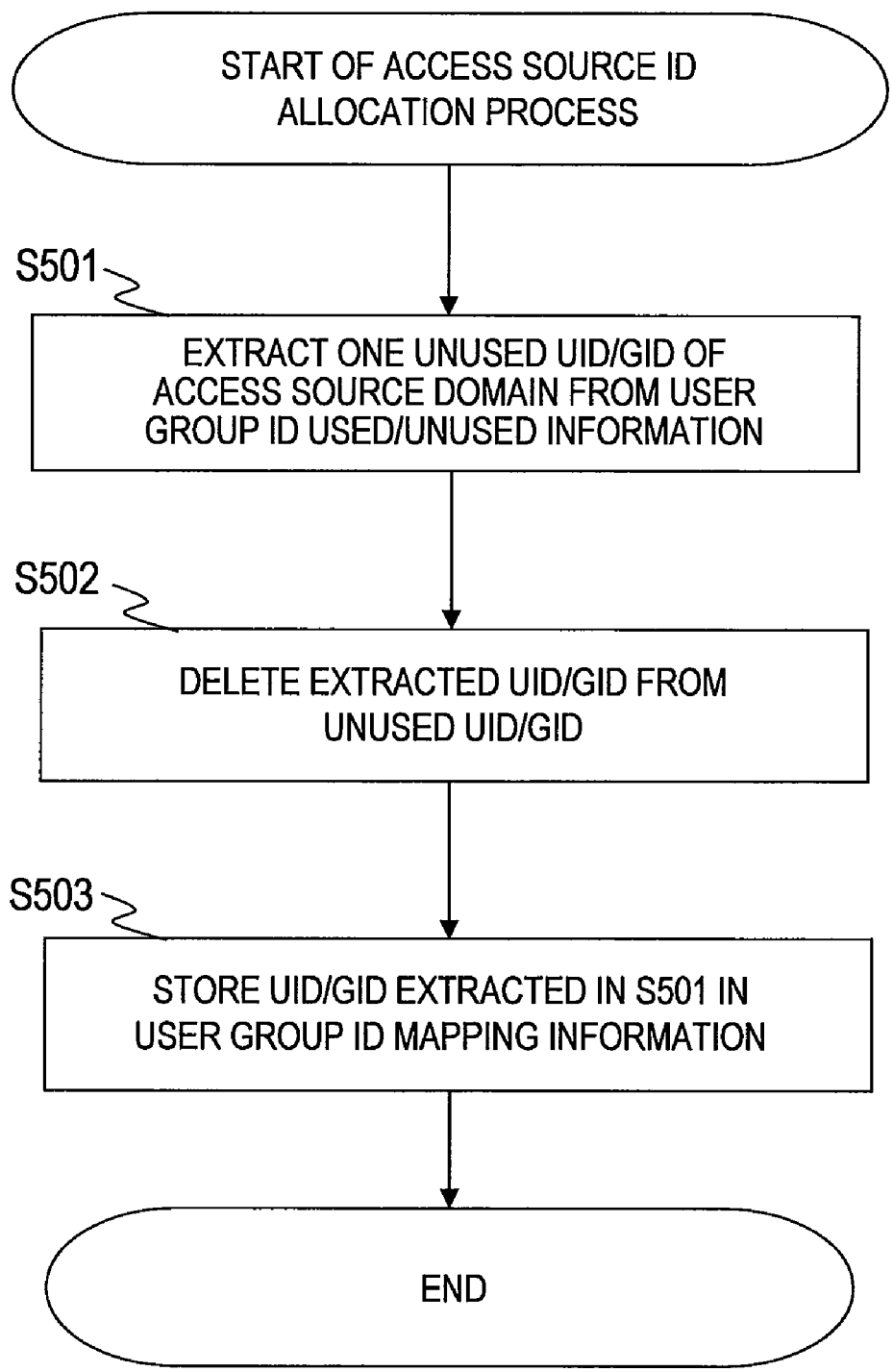
FIG. 13 is a flowchart of an access source ID allocation process executed by the user group ID dynamic conversion processing module in accordance with the first embodiment of this invention.

FIG. 13 is a flowchart of the access source ID allocation process executed by the user group ID dynamic conversion processing module 411 according to the first embodiment of this invention.

The access source ID allocation process is executed in the step S304 of the reply process (FIG. 12) of the user group ID dynamic conversion processing module 411.

First, the user group ID dynamic conversion processing module 411 selects a record where the domain ID of the specified access source user management domain 105 matches the domain ID 4021 of the user group ID used/unused information 402 from the user group ID used/unused information 402. Then, the user group ID dynamic conversion processing module 411 extracts one UID or GID from UIDs or GIDs stored in the unused UID/GID 4023 of the selected record (S501).

The user group ID dynamic conversion processing module 411 deletes the extracted UID or GID from the unused UID/GID 4023 of the selected record (S502).

The user group ID dynamic conversion processing module 411 stores the extracted UID or GID in the box included in the new record added in the step S302 and corresponding to the domain ID of the specified access source user management domain 105 or the box selected in the step S303 (S503).

The user group dynamic conversion processing module 411 stores information indicating nonreflection in the management server reflection flag 4034 of the record including the box in which the UID or the GID has been stored.

The user group ID dynamic conversion processing module 411 judges whether the received reply is for a process regarding updating of the user ID.

If the reply is for the process regarding the updating of the user ID, the user group ID dynamic conversion processing module 411 stores information indicating that correspondence is permanent in the status 4033 of the record including the box in which the UID or the GID has been stored.

On the other hand, if the reply is not for the process regarding the updating of the user ID, the user group ID dynamic conversion processing module 411 stores information indicating that correspondence is not permanent (correspondence is temporary) in the status 4033 of the record including the box in which the UID or the GID has been stored. In this case, however, the user group ID dynamic conversion processing module 411 may store not the information indicating that the correspondence is temporary but the information indicating that the correspondence is permanent in the status 4033 of the record including the box in which the UID or the GID has been stored.

Then, the user group ID dynamic conversion processing module 411 finishes the access source ID allocation process.

Figure 14:
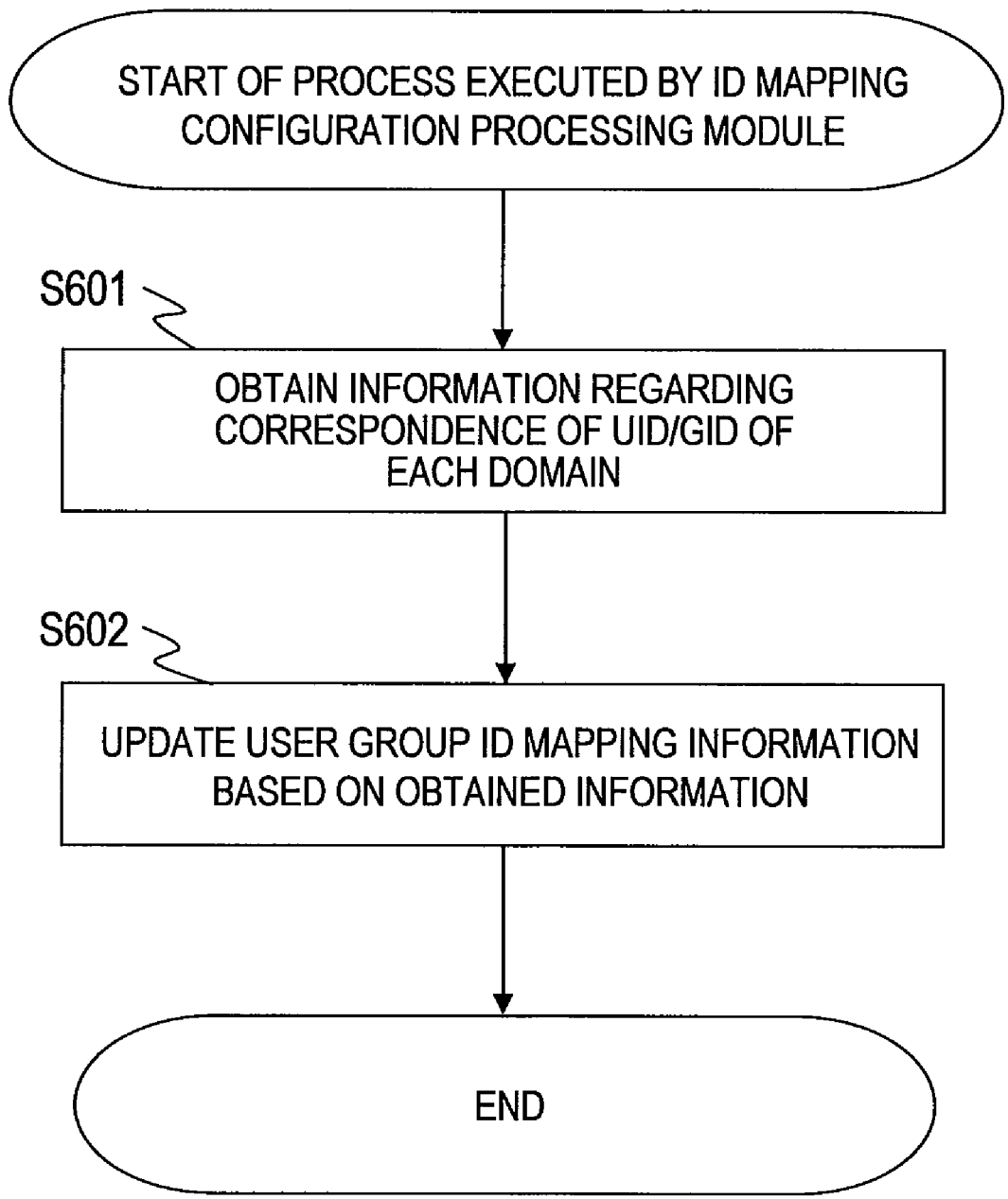
FIG. 14 is a flowchart of a process executed by the ID mapping configuration processing module in accordance with the first embodiment of this invention.

FIG. 14 is a flowchart of the process executed by the ID mapping configuration processing module 412 according to the first embodiment of this invention.

After the manager inputs information regarding correspondence of UID or GID between the user management domains 105 to the NAS 200 after integration or the like, the ID mapping configuration processing module 412 starts the process.

First, the ID mapping configuration processing module 412 obtains the information regarding the correspondence of the UID or the GID between the user management domains 105 which has been input by the manager (S601).

Then, the ID mapping configuration processing module 412 updates the user group ID mapping information 403 based on the obtained information (S602).

Specifically, the ID mapping configuration processing module 412 creates a new record in the user group ID mapping information 403. The ID mapping configuration processing module 412 stores the obtained correspondence in the new record.

Then, the ID mapping configuration processing module 412 finishes the process.

Thus, if the user belongs to a plurality of user management domains 105, after integration, the user can access any file systems of the plurality of the user management domains 105 by the same authority.

Figure 15:
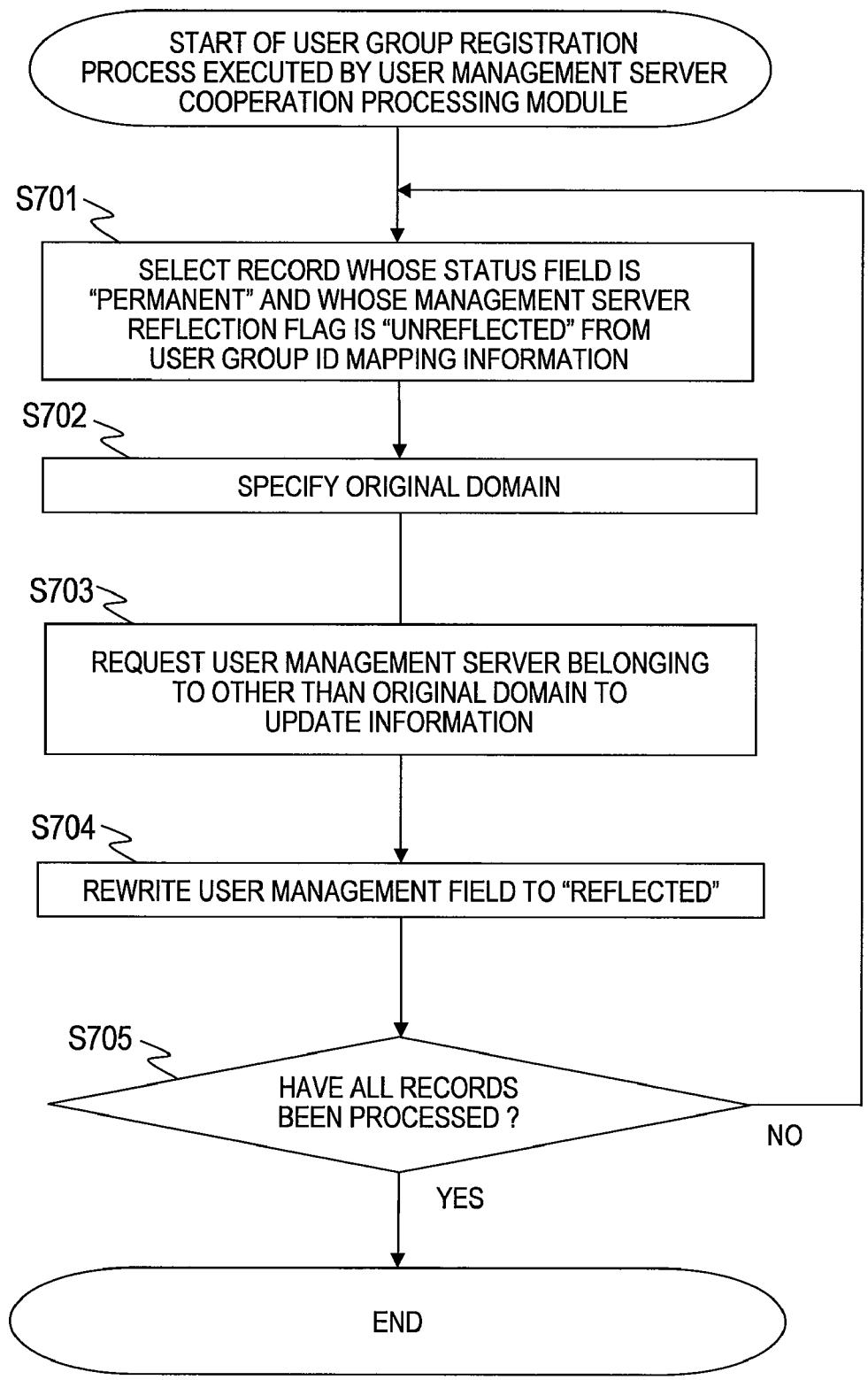
FIG. 15 is a flowchart of a user group registration process executed by a user management server association processing module in accordance with the first embodiment of this invention.

FIG. 15 is a flowchart of a user group registration process executed by the user management server association processing module 413 according to the first embodiment of this invention.

The user management server association processing module 413 executes the user group registration process at predetermined intervals.

First, the user management server association processing module 413 selects all records indicating that the status 4033 of the user group ID mapping information 403 is permanent from the user group ID mapping information 403. Then, the user management server association processing module 413 selects all records indicating that the management server reflection flag 4034 of the user group ID mapping information 403 is nonreflection from the selected records (S701).

The user management server association processing module 413 sequentially selects user management domains 105. The user management server association processing module 413 executes the following process for each selected user management domain 105 to specify an original domain.

The user management server association processing module 413 selects a column (box) corresponding to the selected user management domain 105 from the record selected from the user group ID mapping information 403. The user management server association processing module 413 extracts a UID or GID stored in the selected box.

The user management server association processing module 413 selects a record where the domain ID of the selected user management domain matches the domain ID 4021 of the user group ID used/unused information 402 from the user group ID used/unused information 402. The user management server association processing module 413 judges whether the extracted UID or GID is included in the used UID/GID 4022 of the selected record.

If the UID or the GID is included in the used UID/GID 4022, the user management server association processing module 413 specifies the selected user management domain 105 as an original domain (S702). On the other hand, if the UID or the GID is not included in the used UID/GID 4022, the user management server association processing module 413 does not set the selected user management domain 105 as an original domain.

The user management server association processing module 413 requests a user management server 101 of the user management domain 105 other than that of the specified original domain to update information regarding a registered user (S703). Upon reception of the request, the user management server 101 updates the information regarding the registered user.

Specifically, the user management server 101 registers a value created by combining a user name or a group name of the original domain with the domain ID of the original domain together with the UID or the GID as a user name or a group name in the user management domain 105 other than the original domain.

As an example, a case where a user name of the original domain is "user_a," and the domain ID of the original domain is "domain_a. com" will be described. In this case, the user management server 101 registers "user_a@domain_a.com" or "user_a+domain_a.com" together with a UID or a GID as a user name or a group name in the user management domain 105 other than the original domain.

The user management server association processing module 413 stores information indicating that data has been reflected in the management server reflection flag 4034 of the record selected in the step S701 (S704).

In step S705, the user management server association processing module 413 judges whether all records have been selected. If none of the records has been selected, the user management server association processing module 413 returns to the step S701 to repeat the user group registration process.

On the other hand, if all the records have been selected, the user management server association processing module 413 finishes the user group registration process.

Figure 16:
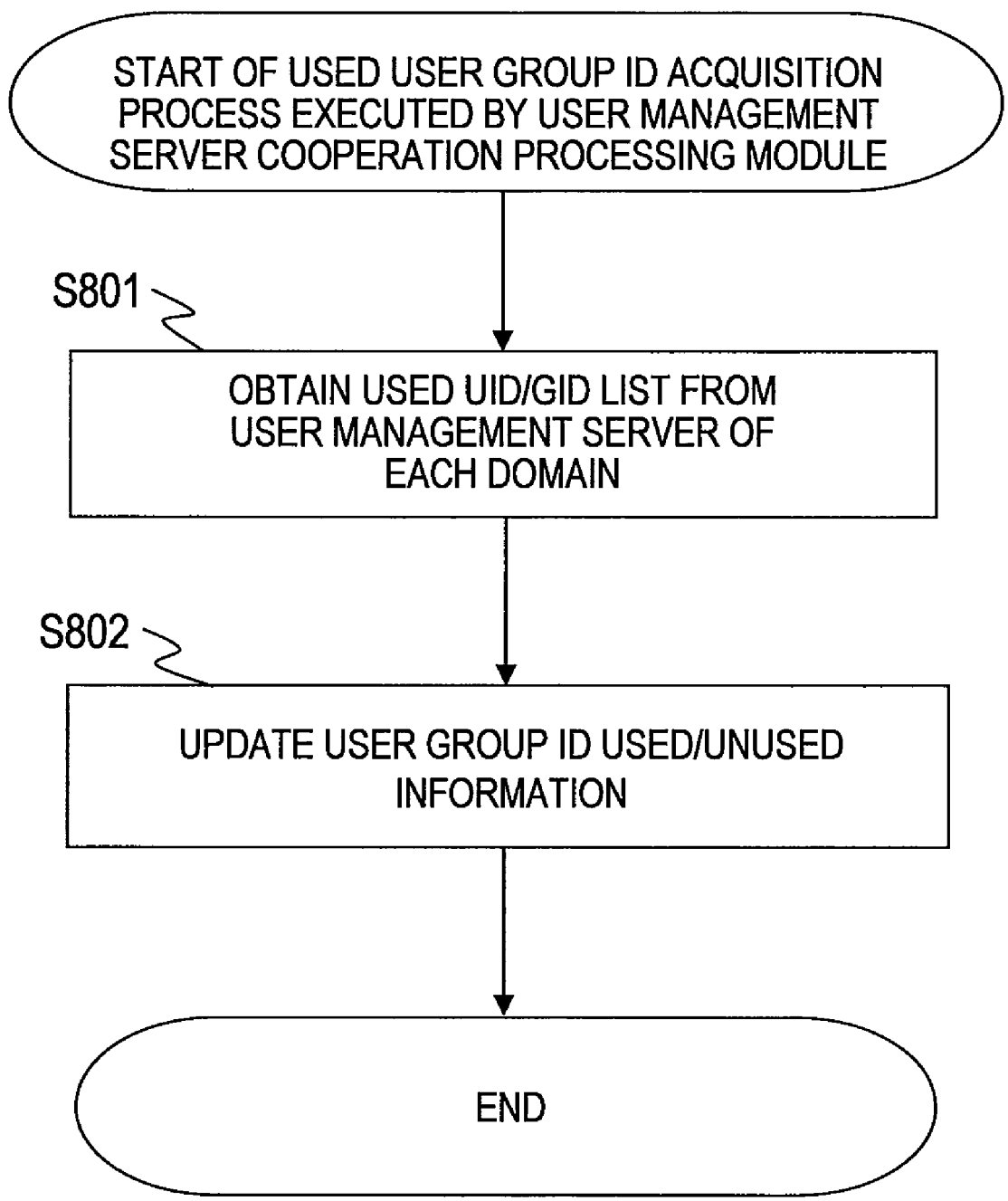
FIG. 16 is a flowchart of a used user group ID acquisition process executed by a user management server association processing module in accordance with the first embodiment of this invention.

FIG. 16 is a flowchart of a used user group ID acquisition process executed by the user management server association processing module 413 according to the first embodiment of this invention.

The user management server association processing module 413 executes the used user group ID acquisition process at predetermined intervals.

First, the user management server association processing module 413 obtains a list of used UIDs or GIDs from the user management server 101 belonging to each user management domain 105 (S801).

Then, the user management server association processing module 413 updates the user group ID used/unused information 402 based on the obtained list of used UIDs and GIDs (S802).

Specifically, the user management server association processing module 413 selects a record where the domain ID of the user management domain 105 to which the acquisition source user management server 101 of the list of used UIDs and GIDs matches the domain ID 4021 of the user group ID used/unused information 402 from the user group ID used/unused information 402. Then, the user management server association processing module 413 stores the obtained list of used UIDs and GIDs in the used UID/GID 4022 of the selected record.

The user management server association processing module 413 creates a list of unused UIDs and GIDs based on the obtained list of used UIDs and GIDs. The user management server association processing module 413 stores the created list of unused UIDs and GIDs in the unused UID/GID 4023 of the selected record.

Then, the user management server association processing module 413 finishes the used user group ID acquisition process.

As described above, the user management server association processing module 413 automatically creates or updates the user group ID used/unused information 402. Thus, the manager does not need to investigate and set a used UID and GID for each domain.

According to the first embodiment of this invention, configuration when services of a plurality of user management domains are integrated can be facilitated. Only information regarding only a user which has actually made a file access request is stored in the user group ID mapping information 403. Thus, a data size of the user group ID mapping information 403 can be reduced.

The embodiment of this invention has been described by way of a case where the invention is applied to the file server client system. However, the invention may be applied to any server client system which transfers user group information between the server and the client. For example, the embodiment of this invention can be applied to a database server client system, a chat server client system, or a telnet server client system.

Second Embodiment

A configuration of a computer system before and after integration according to a second embodiment of this invention is similar to that of the first embodiment of this invention except a NAS 200 after integration. Similar components are denoted by similar reference numerals, and their description will be omitted.

Figure 17:
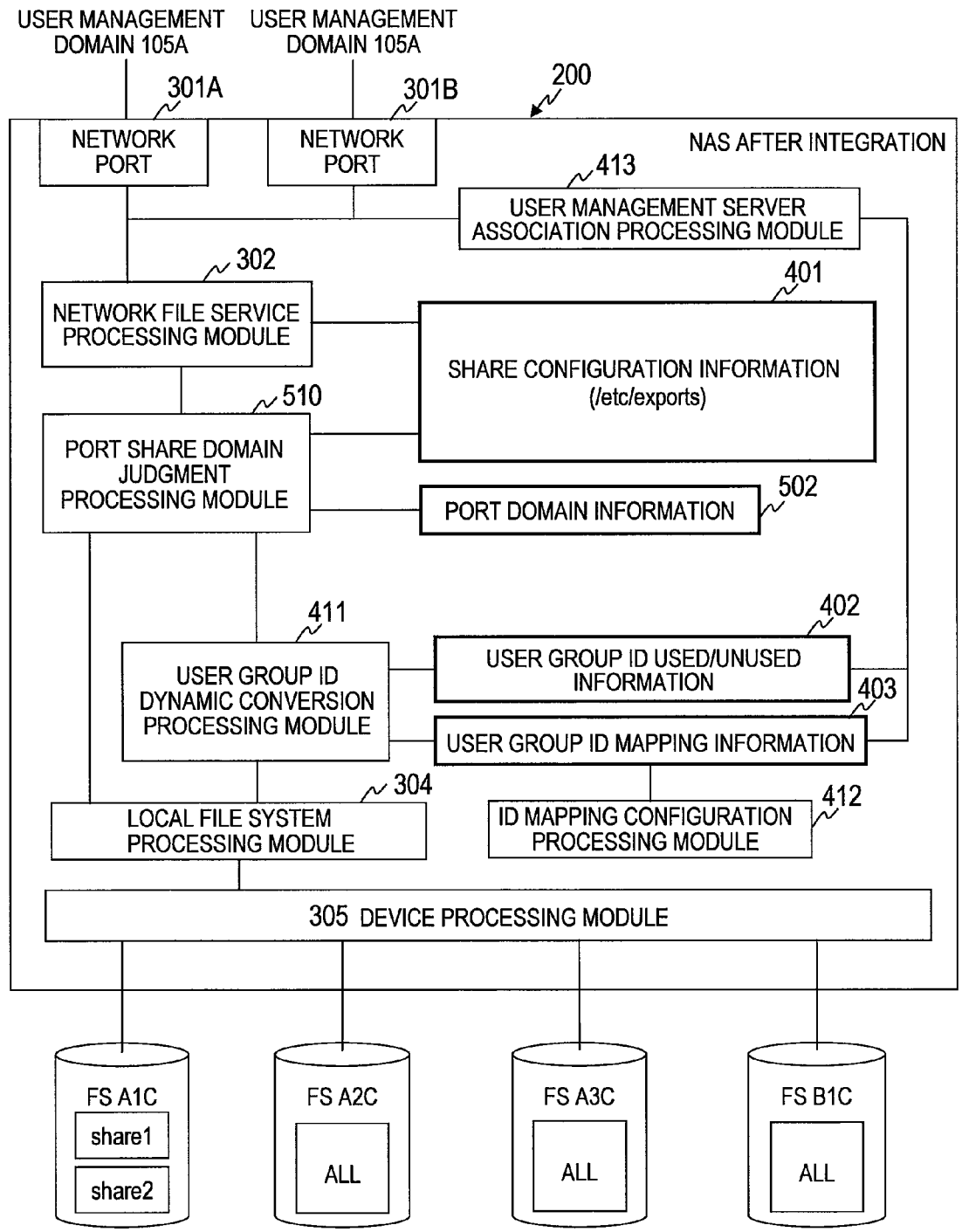
FIG. 17 is a block diagram illustrating a functional configuration of the NAS after integration in accordance with a second embodiment of this invention.

FIG. 17 is a block diagram of a functional configuration of the NAS 200 after integration according to the second embodiment of this invention.

The NAS 200 after integration includes network ports 301A and 301B, a network file service processing module 302, a port share domain judgment processing module 510, a user group ID dynamic conversion processing module 411, a local file system processing module 304, a device processing module 305, an ID mapping configuration processing module 412, and a user management server association processing module 413. The network file service processing module 302, the user group ID dynamic conversion processing module 411, the local file system processing module 304, the device processing module 305, the ID mapping configuration processing module 412, and the user management server association processing module 413 are similar to those disposed in the NAS 200 after integration according to the first embodiment of this invention, and thus their description will be omitted.

The network port 301 (including 301A and 301B) is an interface connected to an L3 switch 104. The network port 301 may not correspond to a physical network card, or may be a logical port such as an IP alias or VLAN.

According to the second embodiment of this invention, the network port 301 is connected to any one of networks of user management domains 105. Thus, the NAS 200 after integration includes the number of network ports 301 equal to the number of integrated user management domains 105.

The connection of the network port 301 with the network of the user management domain 105 may be physical or logical. In other words, an access target of a client computer 100 only needs to be a network port 301 connected to the user management domain 105 to which the client computer 100 belongs. In other words, a mounting access of the client computer 100 only needs to be a network port 301 connected to the user management domain 105 to which the client computer 100 belongs.

The embodiment of this invention will be described by way of a case where the network port 301A is connected to a network of a user management domain 105A while the network port 301B is connected to a network of a user management domain 105B.

The port share domain judgment processing module 510 judges whether a UID and a GID need to be converted. A process executed by the port share domain judgment processing module 510 will be described referring to FIG. 19.

The NAS 200 after integration stores the share configuration information 401, the user group ID used/unused ID information 402, the user group ID mapping information 403, and port domain information 502. The share configuration information 401, the user group ID used/unused information 402, and the user group ID mapping information 403 are similar to those stored in the NAS 200 after integration of the first embodiment of this invention, and thus their description will be omitted.

The port domain information 502 indicates correspondence between the network port 301 and the user management domain 105 connected to the network port 301. The port domain information 502 will be described below in detail referring to FIG. 18.

Figure 18:
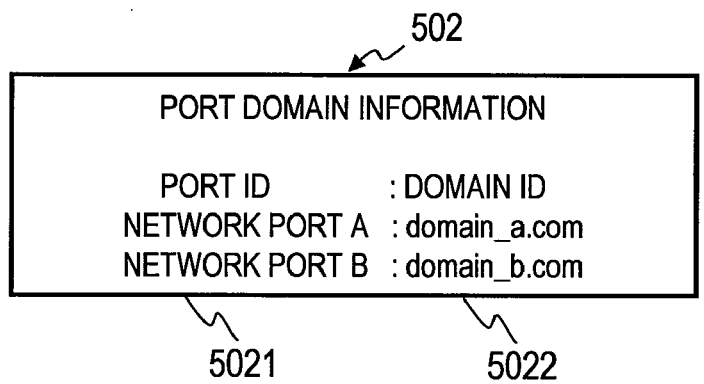
FIG. 18 is a diagram illustrating a configuration of a port domain information stored in the NAS after integration in accordance with the second embodiment of this invention.

FIG. 18 illustrates a configuration of the port domain information 502 stored in the NAS 200 after integration according to the second embodiment of this invention.

The port domain information 502 contains a port ID 5021 and a domain ID 5022.

The port ID 5021 is a unique identifier of the network port 301 disposed in the NAS 200 after integration. The domain ID 5022 is a unique identifier of a user management domain 105 connected to the network port 301 identified by the port ID 5021 of a relevant record.

Figure 19:
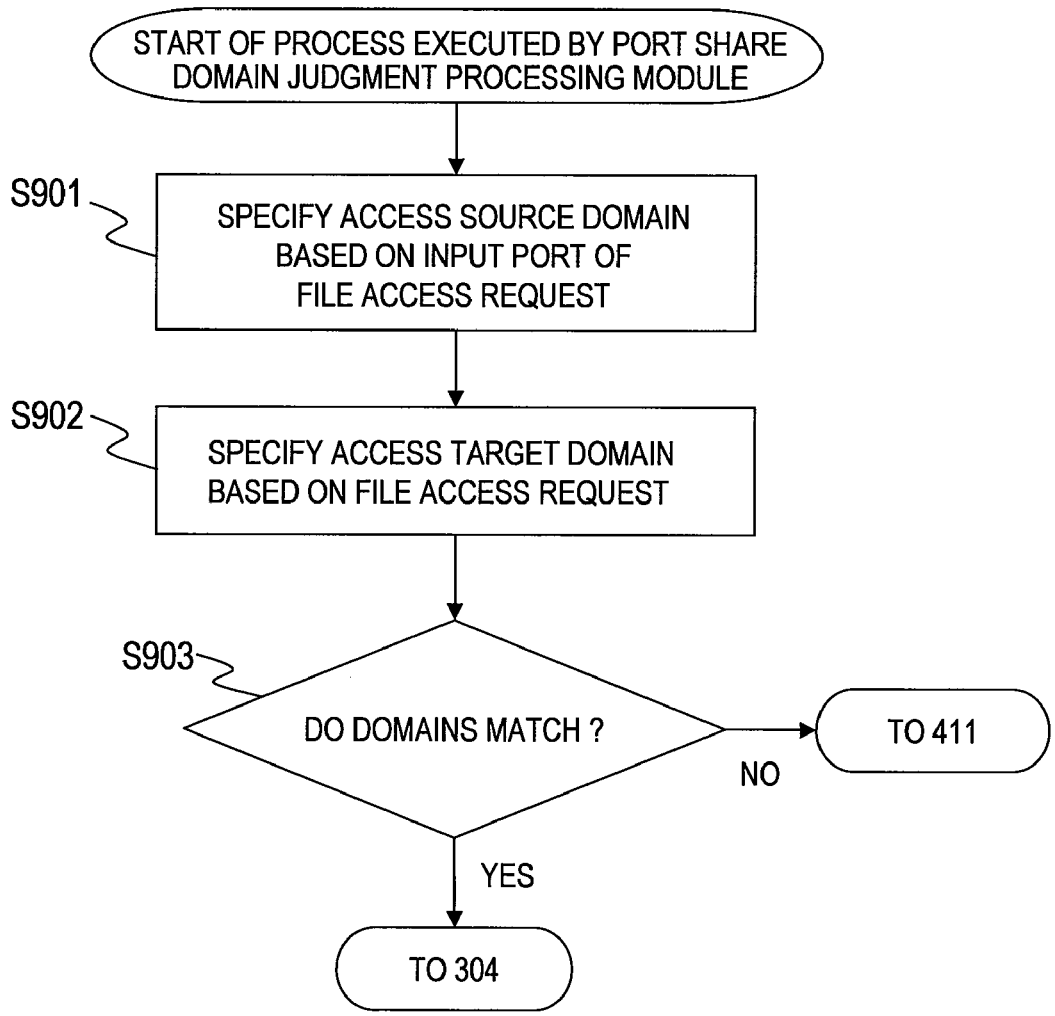
FIG. 19 is a flowchart of a process executed by a port share domain judgment processing module in accordance with the second embodiment of this invention.

FIG. 19 is a flowchart of a process executed by the port share domain judgment processing module 510 according to the second embodiment of this invention.

Upon reception of a file access request from the network file service processing module 302, the port share domain judgment processing module 510 starts the process.

First, the port share domain judgment processing module 510 specifies a network port 301 which has received the received file access request. Next, the port share domain judgment processing module 510 selects a record where an identifier of the specified network port 301 matches the port ID 5021 of the port domain information 502 from the port domain information 502. The port share domain judgment processing module 510 extracts a domain ID 5022 from the selected record.

The port share domain judgment processing module 510 specifies the user management domain 105 identified by the extracted domain ID 5022 as an access source domain (S901).

The port share domain judgment processing module 510 extracts a file handle capable of identifying an access target file from the received file access request. The port share domain judgment processing module 510 converts the extracted file handle into an access target path.

The port share domain judgment processing module 510 selects a record where a part or all parts of the path created by the conversion match a public directory path 4011 of the share configuration information 401 from the share configuration information 401.

The port share domain judgment processing module 510 extracts a source domain ID 4013 from the selected record. The port share domain judgment processing module 510 specifies a user management domain 105 identified by the extracted source domain ID 4013 as an access target domain (S902).

The port share domain judgment processing module 510 judges whether the extracted domain ID 5022 matches the extracted source domain ID 4013. Accordingly, the port share domain judgment processing module 510 judges whether the specified access source domain matches the access target domain.

If the domain ID 5022 matches the source domain ID 4013, the access source domain matches the access target domain. In this case, conversion of the UID and the GID is unnecessary. Accordingly, the port share domain judgment processing module 510 passes the received file access request to the local file system processing module 304. Then, the port share domain judgment processing module 510 finishes the process.

On the other hand, if the domain ID 5022 does not match the source domain ID 4013, the access source domain does not match the access target domain. In this case, conversion of the UID and the GID is necessary. Accordingly, the port share domain judgment processing module 510 passes the received file access request to the user group ID dynamic conversion processing module 411. Then, the port share domain judgment processing module 510 finishes the process.

As described above, network configuration can be dealt with more flexibly in the second embodiment of this invention than in the first embodiment of this invention. For example, according to the second embodiment of this invention, even if the user management domain 105 does not match the network domain (IP address domain), the services of the user management domains 105 can be integrated.

Third Embodiment

A configuration of a computer system before and after integration according to a third embodiment of this invention is similar to that of the first embodiment of this invention except a NAS 200 after integration. Similar components are denoted by similar reference numerals, and their description will be omitted.

Figure 20:
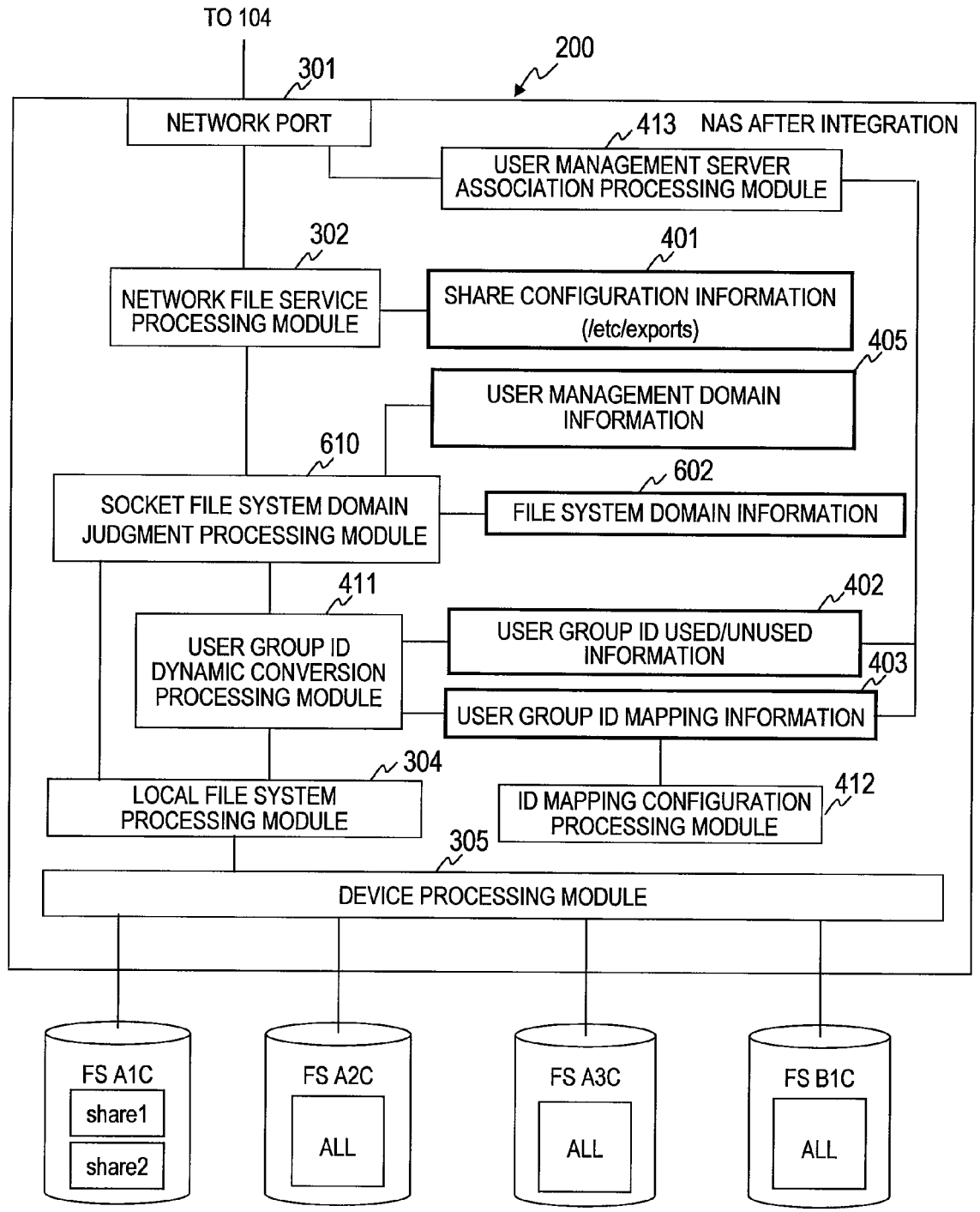
FIG. 20 is a block diagram illustrating a functional configuration of the NAS after integration in accordance with a third embodiment of this invention.

FIG. 20 is a block diagram illustrating a functional configuration of the NAS 200 after integration according to the third embodiment of this invention.

The NAS 200 after integration includes the network port 301, the network file service processing module 302, a socket file system domain judgment processing module 610, a user group ID dynamic conversion processing module 411, a local file system processing module 304, a device processing module 305, an ID mapping configuration processing module 412, and the user management server association processing module 413. The network file service processing module 302, the user group ID dynamic conversion processing module 411, the local file system processing module 304, the device processing module 305, the ID mapping configuration processing module 412, and the user management server association processing module 413 are similar to those disposed in the NAS 200 after integration of the first embodiment of this invention, and thus their description will be omitted.

The socket file system domain judgment processing module 610 judges whether conversion of a UID and a GID is necessary. A process executed by the socket file system domain judgment processing module 610 will be described referring to FIG. 22.

The NAS 200 after integration includes the share configuration information 401, the user group ID used/unused information 402, the user group ID mapping information 403, and file system domain information 602. The share configuration information 401, the user group ID used/unused information 402, and the user group ID mapping information 403 are similar to those stored in the NAS 200 after integration of the first embodiment of this invention, and thus their description will be omitted.

However, in the share configuration information 401 of the third embodiment of this invention, the source domain ID 4013 can be omitted.

The file system domain 602 indicates correspondence between a file system and a user management domain 105. The file system domain information 602 will be described below in detail referring to FIG. 21.

Figure 21:
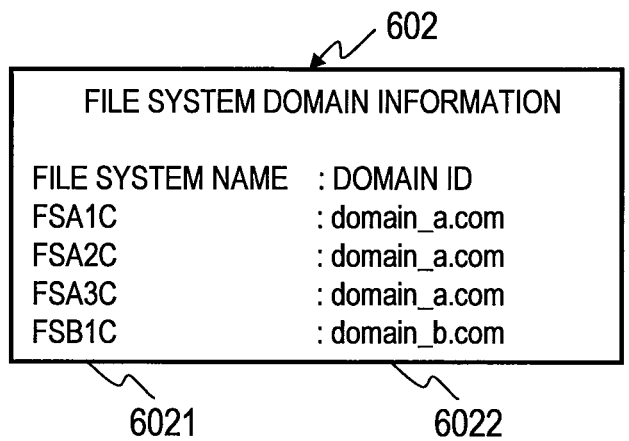
FIG. 21 is a diagram illustrating a configuration of a file system domain information stored in the NAS after integration in accordance with the third embodiment of this invention.

FIG. 21 illustrates a configuration of the file system domain information 602 stored in the NAS 200 after integration according to the third embodiment of this invention.

The file system domain information 602 contains a file system name 6021 and a domain ID 6022.

The file system name 6021 is a unique identifier of the file system. The domain ID 6022 is a unique identifier of a user management domain 105 corresponding to the file system identified by the file system name 6021 of a given record.

Figure 22:
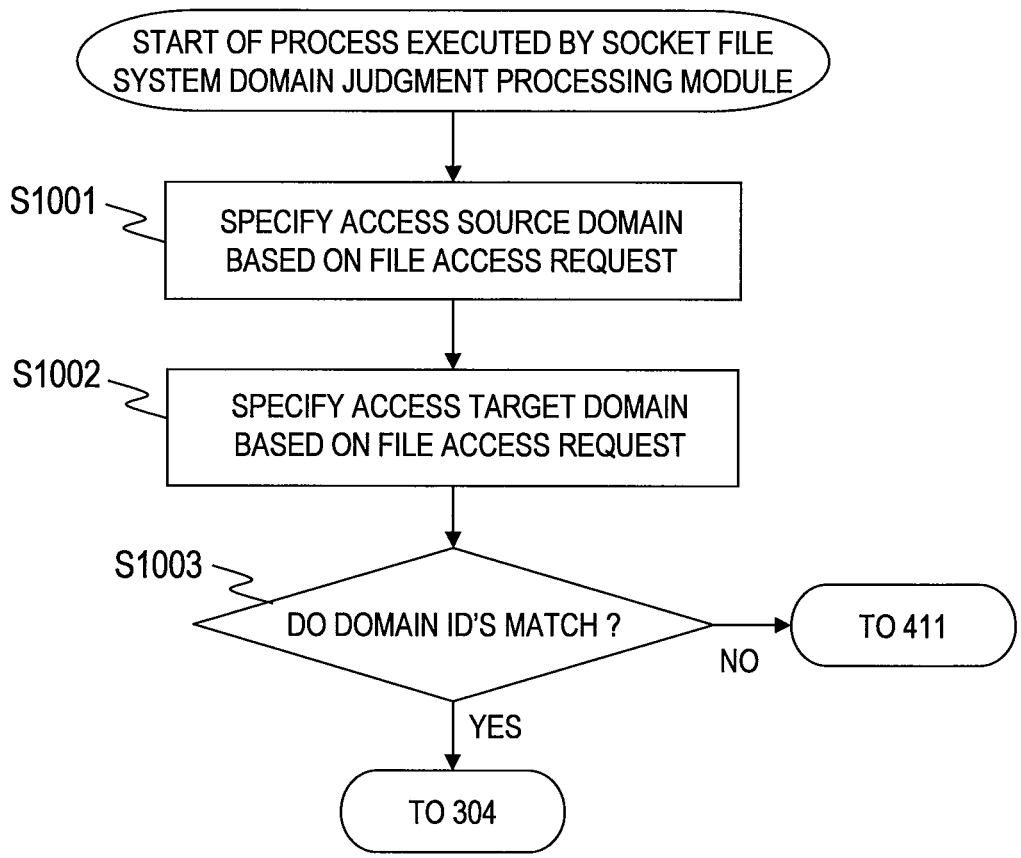
FIG. 22 is a flowchart of a process executed by a socket file system domain judgment processing module in accordance with the third embodiment of this invention.

FIG. 22 is a flowchart of the process executed by the socket file system domain judgment processing module 610 according to the third embodiment of this invention.

Upon reception of a file access request from the network file service processing module 302, the socket file system domain judgment processing module 610 starts the process.

First, the socket file system domain judgment processing module 610 specifies an access source IP address from the received access request.

Then, the socket file system domain judgment processing module 610 selects a record where the specified IP address matches the IP address 4052 of the user management domain information 405 from the user management domain information 405. The socket file system domain judgment processing module 610 extracts a domain ID 4051 from the selected record. The socket file system domain judgment processing module 610 specifies a user management domain 105 identified by the extracted domain ID 4051 as an access source domain (S1001).

The socket file system domain judgment processing module 610 specifies a file system which is an access target of the received file access request. The socket file system domain judgment processing module 610 selects a record where an identifier of the specified file system matches a file system name 6021 of the file system domain information 602 from the file system domain information 602. The socket file system domain judgment processing module 610 extracts a domain ID 6022 from the selected record. The socket file system domain judgment processing module 610 specifies a user management domain 105 identified by the extracted domain ID 6022 as an access target domain (S1002).

The socket file system domain judgment processing module 610 judges whether the extracted domain ID 4051 matches the extracted domain ID 6022. Accordingly, the socket file system domain judgment processing module 610 judges whether the specified access source domain matches the access target domain.

If the domain ID 4051 matches the domain ID 6022, the access source domain matches the access target domain. In this case, conversion of a UID or a GID is unnecessary. The socket file system domain judgment processing module 610 passes the received file access request to the local file system processing module 304. Then, the socket file system domain judgment processing module 610 finishes the process.

On the other hand, if the domain ID 4051 does not match the domain ID 6022, the access source domain does not match the access target domain. In this case, conversion of the UID and the GID is necessary. Thus, the socket file system domain judgment processing module 610 passes the received file access request to the user group ID dynamic conversion processing module 411. Then, the socket file system domain judgment processing module 610 finishes the process.

As described above, according to the third embodiment of this invention, the amount of information stored in the NAS 200 after integration can be smaller than that of the first embodiment of this invention. It is because correspondence between the access target and the user management domain 105 is set for each file system.

Fourth Embodiment

A configuration of a computer system before and after integration according to a fourth embodiment of this invention is similar to that of the first embodiment of this invention except a NAS 200 after integration. Similar components are denoted by similar reference numerals, and their description will be omitted.

Figure 23:
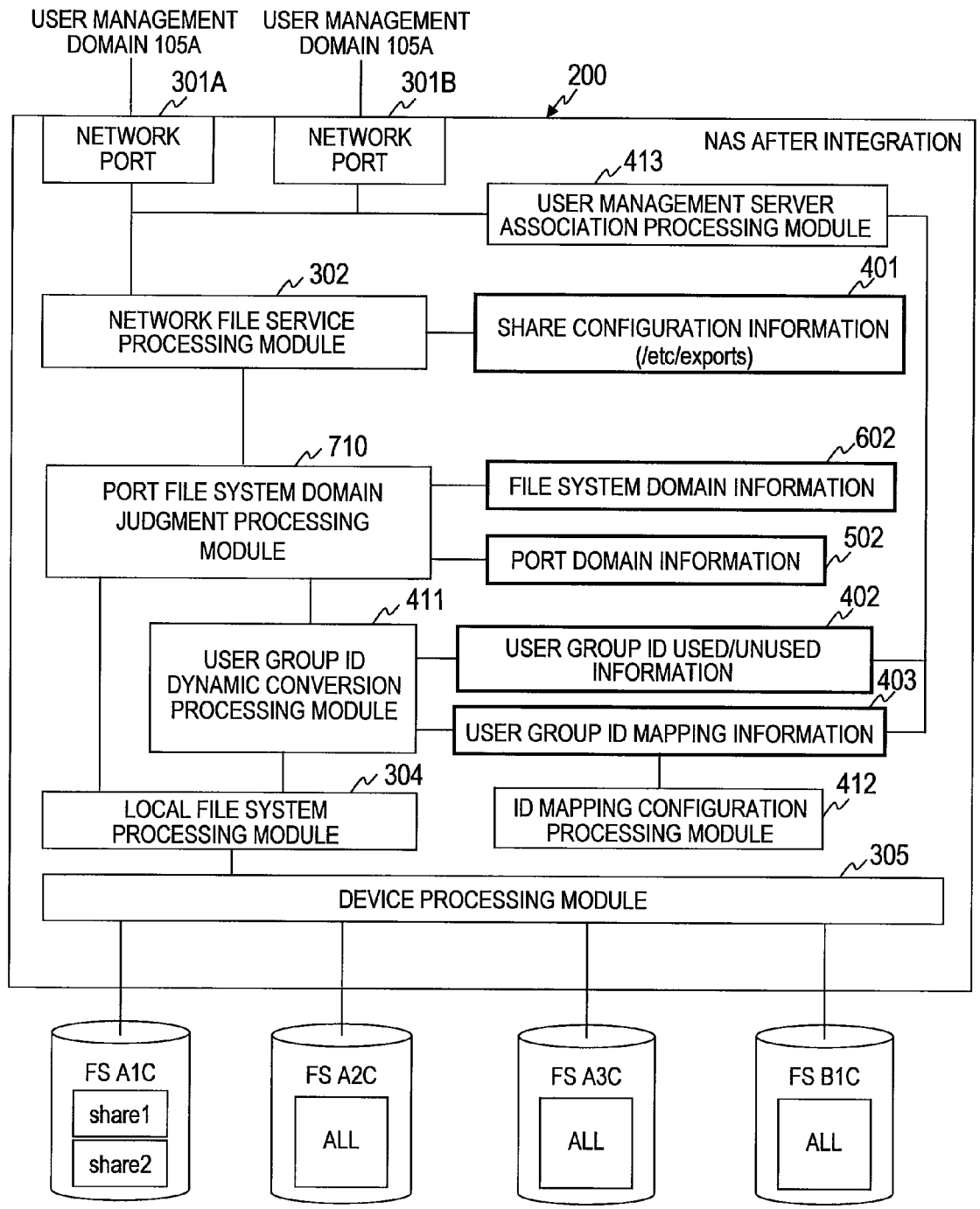
FIG. 23 is a block diagram illustrating a functional configuration of the NAS after integration in accordance with a fourth embodiment of this invention.

FIG. 23 is a block diagram of a functional configuration of the NAS 200 after integration according to the fourth embodiment of this invention.

The NAS 200 after integration includes network ports 301A and 301B, a network file service processing module 302, a port file system domain judgment processing module 710, a user group ID dynamic conversion processing module 411, a local file system processing module 304, a device processing module 305, an ID mapping configuration processing module 412, and a user management server association processing module 413. The network file service processing module 302, the user group ID dynamic conversion processing module 411, the local file system processing module 304, the device processing module 305, the ID mapping configuration processing module 412, and the user management server association processing module 413 are similar to those disposed in the NAS 200 after integration according to the first embodiment of this invention, and thus their description will be omitted.

The network port 301 (including 301A and 301B) is an interface connected to an L3 switch 104. The network port 301 may not correspond to a physical network card, or may be a logical port such as an IP alias or VLAN.

According to the fourth embodiment of this invention, the network port 301 is connected to any one of networks of user management domains 105. Thus, the NAS 200 after integration includes the number of network ports 301 equal to the number of integrated user management domains 105.

The connection of the network port 301 with the network of the user management domain 105 may be physical or logical. In other words, an access target of a client computer 100 only needs to be a network port 301 connected to the user management domain 105 to which the client computer 100 belongs. In other words, a mounting access of the client computer 100 only needs to be a network port 301 connected to the user management domain 105 to which the client computer 100 belongs.

The embodiment of this invention will be described by way of a case where the network port 301A is connected to a network of a user management domain 105A while the network port 301B is connected to a network of a user management domain 105B.

The port file system domain judgment processing module 710 judges whether a UID or a GID has to be converted. A process executed by the port file system domain judgment processing module 710 will be described referring to FIG. 24.

The NAS 200 after integration stores share configuration information 401, user group ID used/unused information 402, user group ID mapping information 403, port domain information 502, and file system domain information 602. The share configuration information 401, the user group ID used/unused information 402, and the user group ID mapping information 403 are similar to those stored in the NAS 200 after integration of the first embodiment of this invention, and thus their description will be omitted. The port domain information 502 is similar to that stored in the NAS 200 after integration of the second embodiment of this invention, and thus its description will be omitted. The file system domain information 602 is similar to that stored in the NAS 200 after integration of the third embodiment of this invention, and thus its description will be omitted.

Figure 24:
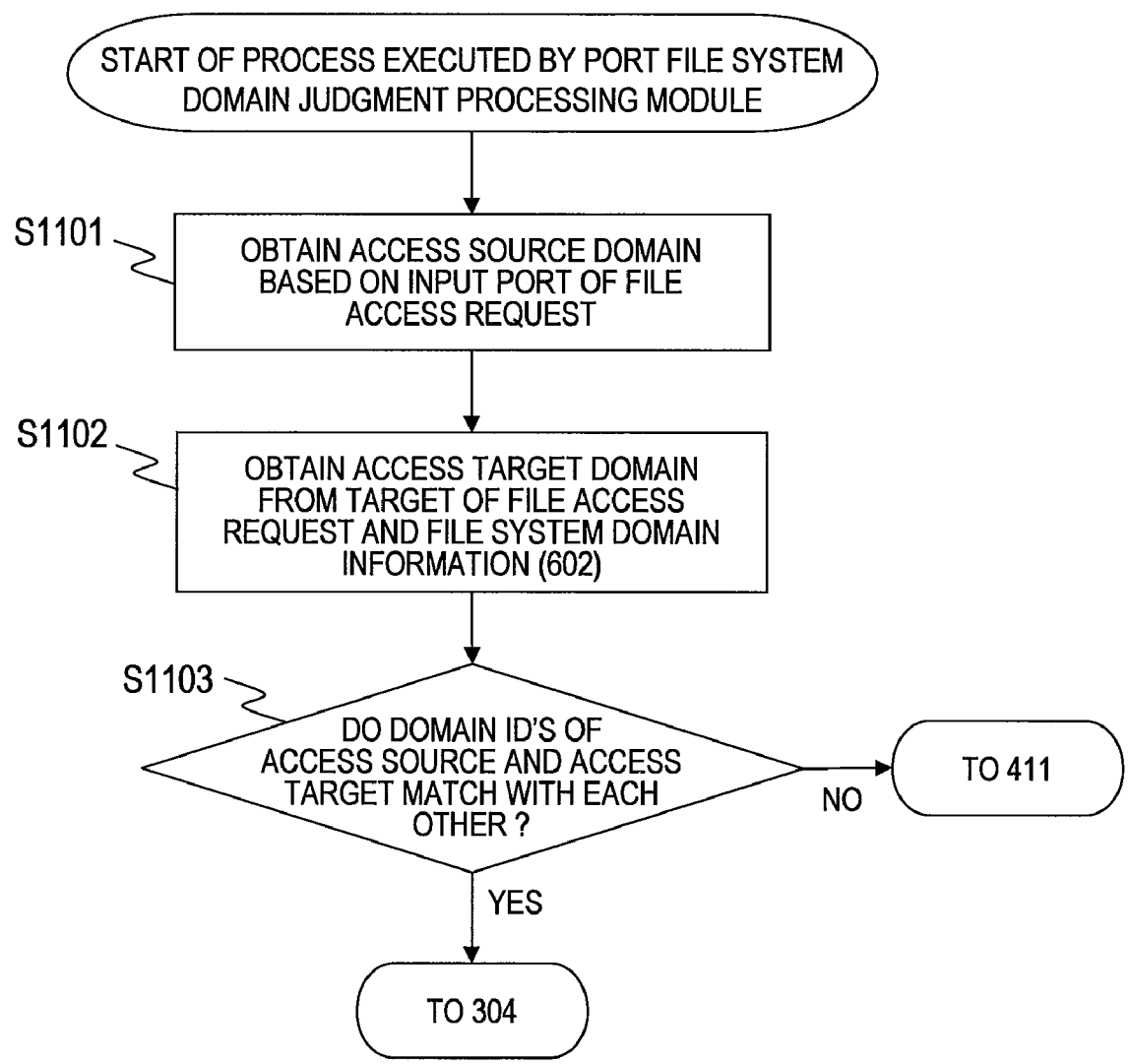
FIG. 24 is a flowchart of a process executed by a port file system domain judgment processing module in accordance with the fourth embodiment of this invention.

FIG. 24 is a flowchart of a process executed by the port file system domain judgment processing module 710 according to the fourth embodiment of this invention.

Upon reception of a file access request from the network file service processing module 302, the port file system domain judgment processing module 710 starts the process.

First, the port file system domain judgment processing module 710 specifies a network port 301 which has received the received file access request. The port file system domain judgment processing module 710 selects a record where an identifier of the specified network port 301 matches the port ID 5021 of the port domain information 502 from the port domain information 502. The port file system domain judgment processing module 710 extracts a domain ID 5022 from the selected record.

The port file system domain judgment processing module 710 specifies the user management domain 105 identified by the extracted domain ID 5022 as an access source domain (S1101).

The port file system domain judgment processing module 710 specifies a file system which is an access target of the received file access request. The port file system domain judgment processing module 710 selects a record where an identifier of the specified file system matches the file system name 6021 of the file system domain information 602 from the file system domain information 602. The port file system domain judgment processing module 710 extracts a domain ID 6022 from the selected record. Then, the port file system domain judgment processing module 710 specifies a user management domain 105 identified by the extracted domain ID 6022 as an access target domain (S1102).

The port file system domain judgment processing module 710 judges whether the extracted domain ID 5022 matches the extracted domain ID 6022. Accordingly, the port file system domain judgment processing module 710 judges whether the specified access source domain matches the access target domain.

If the domain ID 5022 matches the domain ID 6022, the access source domain matches the access target domain. In this case, conversion of the UID or the GID is unnecessary. Accordingly, the port file system domain judgment processing module 710 passes the received file access request to the local file system processing module 304. Then, the port file system domain judgment processing module 710 finishes the process.

On the other hand, if the domain ID 5022 does not match the domain ID 6022, the access source domain does not match the access target domain. In this case, conversion of the UID and the GID is necessary. Accordingly, the port file system domain judgment processing module 710 passes the received file access request to the user group ID dynamic conversion processing module 411. Then, the port file system domain judgment processing module 710 finishes the process.

As described above, the fourth embodiment of this invention has effects similar to those of both of the second and third embodiments of this invention.

Fifth Embodiment

Figure 25:
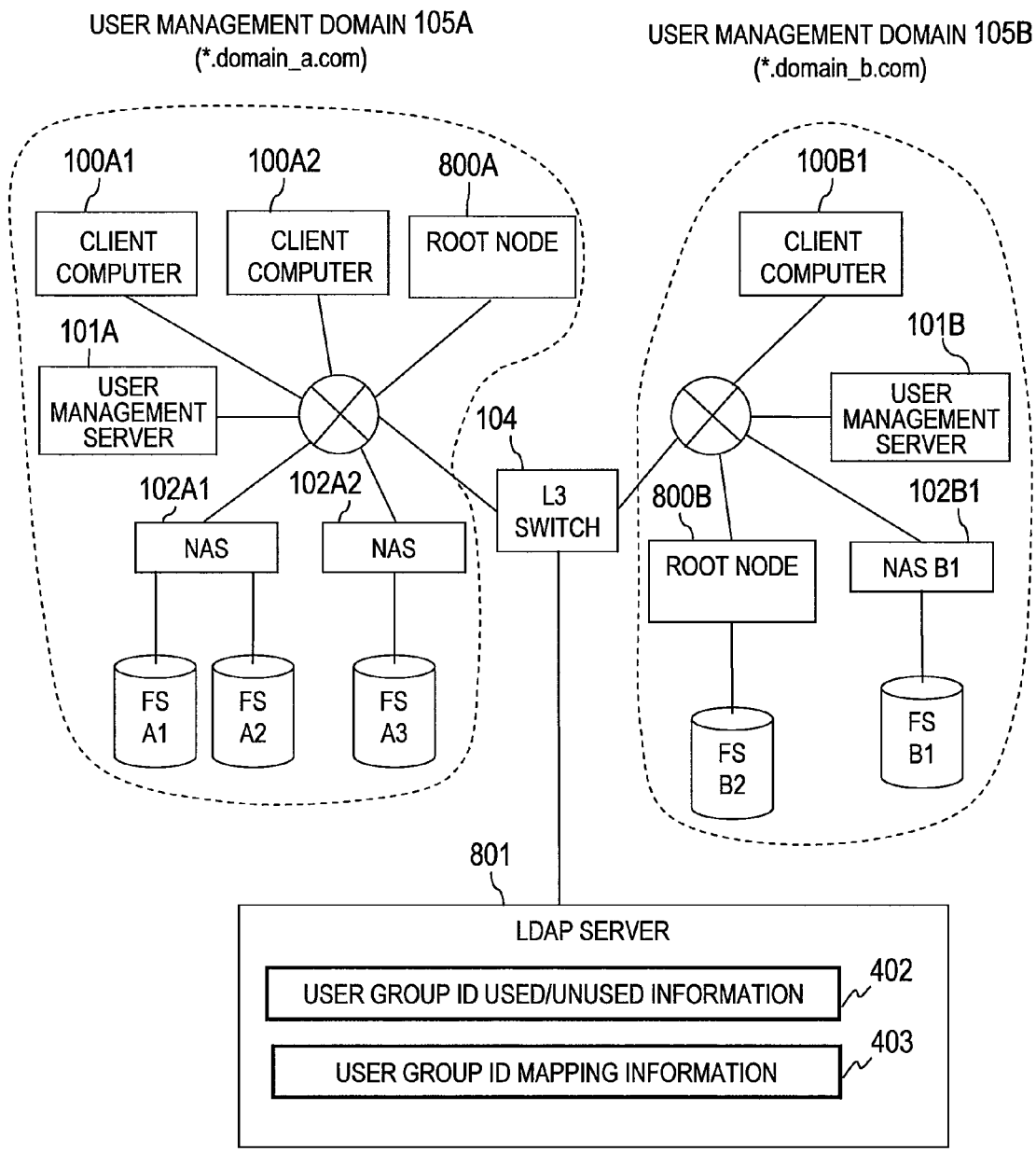
FIG. 25 is a block diagram illustrating a configuration of a computer system after integration in accordance with a fifth embodiment of this invention.

FIG. 25 is a block diagram illustrating a configuration of a computer system after integration according to a fifth embodiment of this invention.

The computer system after integration includes user management domains 105A and 105B, an L3 switch 104, and an LDAP server 801. The L3 switch 104 interconnects networks of the user management domains 105A and 105B and the LDAP server 801.

The user management domain 105A includes a root node 800A in addition to the components in the computer system before integration shown in FIG. 1. The user management domain 105B includes a root node 800B in addition to the components included in the computer system before integration.

However, the root node 800A may not be physically included in the user management domain 105A. The root node 800B may not be physically included in the user management domain 105B.

A physical configuration of the root node 800 (including 800A and 800B) is similar to the NAS 200 after integration of the first embodiment of this invention, and thus its description will be omitted. However, the root node 800 may not be connected to a storage system. A functional configuration of the root node 800 will be described in detail referring to FIG. 26.

The LDAP server 801 is included in neither the user management domain 105A nor the user management domain 105B. However, the LDAP server 801 may be included in one of the two.

The LDAP server 801 is a computer which includes a CPU, a memory, and an interface. The LDAP server 801 stores user group ID used/unused information 402 and user group ID mapping information 403. The user group ID used/unused information 402 and the user group ID mapping information 403 are similar to those stored in the NAS 200 after integration of the first embodiment of this invention, and thus their description will be omitted.

Figure 26:
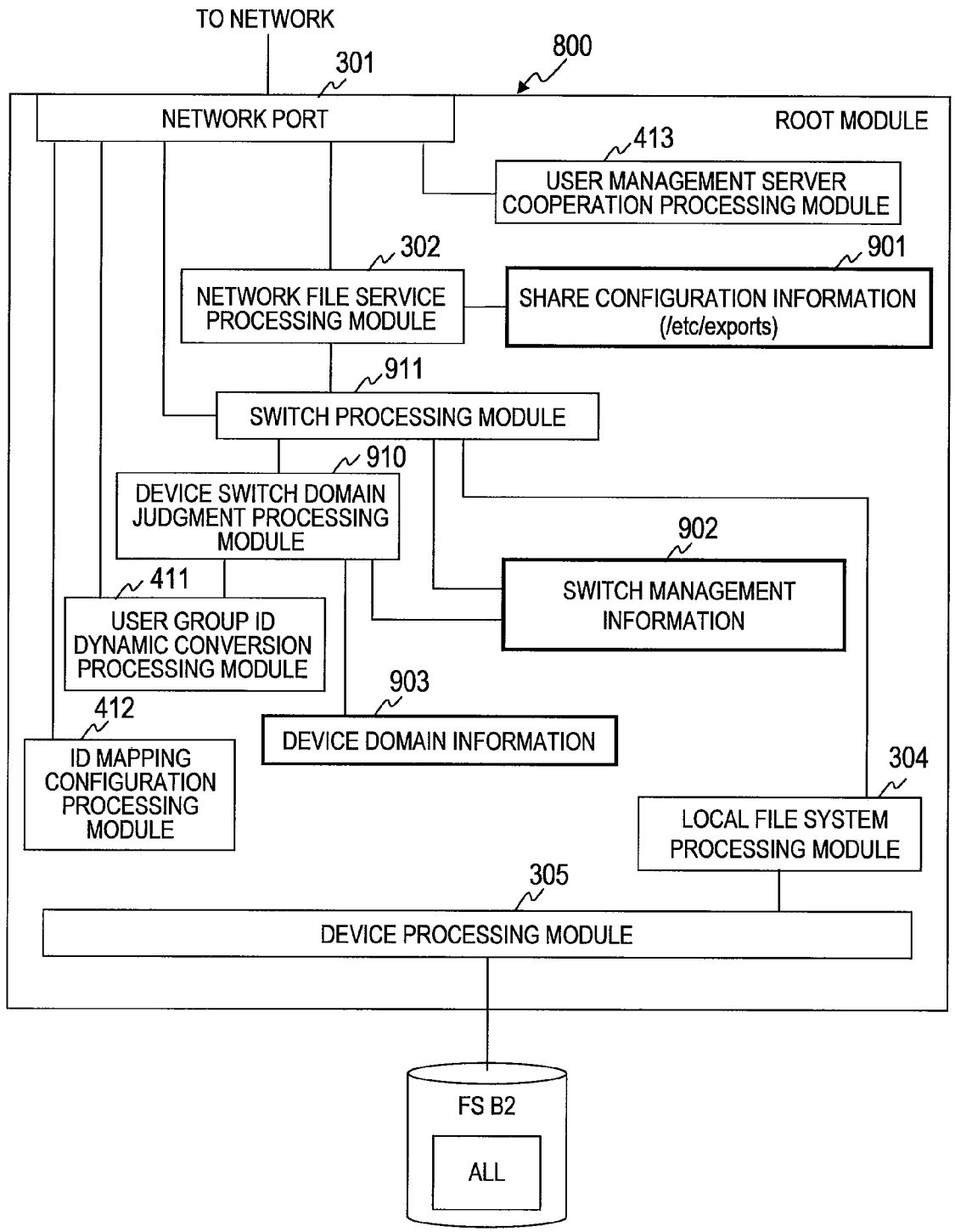
FIG. 26 is a block diagram illustrating a functional configuration of a root node in accordance with the fifth embodiment of this invention.

FIG. 26 is a block diagram illustrating a functional configuration of the root node 800 according to the fifth embodiment of this invention.

The root node 800 includes a network port 301, a network file service processing module 302, a switch processing module 911, a device switch domain judgment processing module 910, a user group ID dynamic conversion processing module 411, a local file system processing module 304, a device processing module 305, an ID mapping configuration processing module 412, and a user management server association processing module 413. The network port 301, the network file service processing module 302, the user group ID dynamic conversion processing module 411, the local file system processing module 304, the device processing module 305, the ID mapping configuration processing module 412, and the user management server association processing module 413 are similar to those disposed in the NAS 200 after integration according to the first embodiment of this invention, and thus their description will be omitted.

The switch processing module 911 executes a request process and a reply process. The request process executed by the switch processing module 911 will be described referring to FIG. 30. The reply process executed by the switch processing module 911 will be described referring to FIG. 32.

The device switch domain judgment processing module 910 executes a request process and a reply process. The request process executed by the device switch domain judgment processing module 910 will be described referring to FIG. 31. The reply process executed by the device switch domain judgment processing module 910 will be described referring to FIG. 33.

The root node 800 stores share configuration information 901, switch management information 902, and device domain information 903.

The share configuration information 901 is information regarding file share services. The share configuration information 901 will be described below in detail referring to FIG. 27.

The switch management information 902 indicates a file access request or reply transfer target. The switch management information 902 will be described below in detail referring to FIG. 28.

The device domain information 903 indicates correspondence between a device including the NAS 102 and the root node 800 and a user management domain 105 to which the device belongs. The device domain information 903 will be described below in detail referring to FIG. 29.

FIG. 27 illustrates a configuration of the share configuration information 901 stored in the root node 800 according to the fifth embodiment of this invention.

The share configuration information 901 contains a public directory path 9011, a public client 9012, and a share ID 9013.

The public directory path 9011 is a directory path made public by the client computer 100. The directory path indicates a position for storing a file or the like.

The public client 9012 indicates a client computer 100 which becomes a public target of the public directory path 9011 of a given record. The share ID 9013 is a unique identifier of a file or a file share service corresponding to the public directory path 9011 of the record.

FIG. 28 illustrates a configuration of the switch management information 902 stored in the root node 800 according to the fifth embodiment of this invention.

The switch management information 902 contains a share ID 9021, a device ID 9022, and an algorithm ID 9023.

The share ID 9021 is a unique identifier of a file or a file share service. The device ID 9022 indicates a transfer target of a file access request to the file or the file share service identified by the share ID 9021 of a given record. The algorithm ID 9023 is a unique identifier of an algorithm for converting a file handle contained in the file access request to the file or the file share service identified by the share ID 9021 of the record.

FIG. 29 illustrates a configuration of the device domain information 903 stored in the root node 800 according to the fifth embodiment of this invention.

The device domain information 903 contains a device ID 9031 and a domain ID 9032.

The device ID 9031 is a unique identifier of the device which includes the NAS 102 and the root node 800. The domain ID 9032 is a unique identifier of a user management domain 105 to which the device identified by the device ID 9031 of the record belongs.

Figure 30:
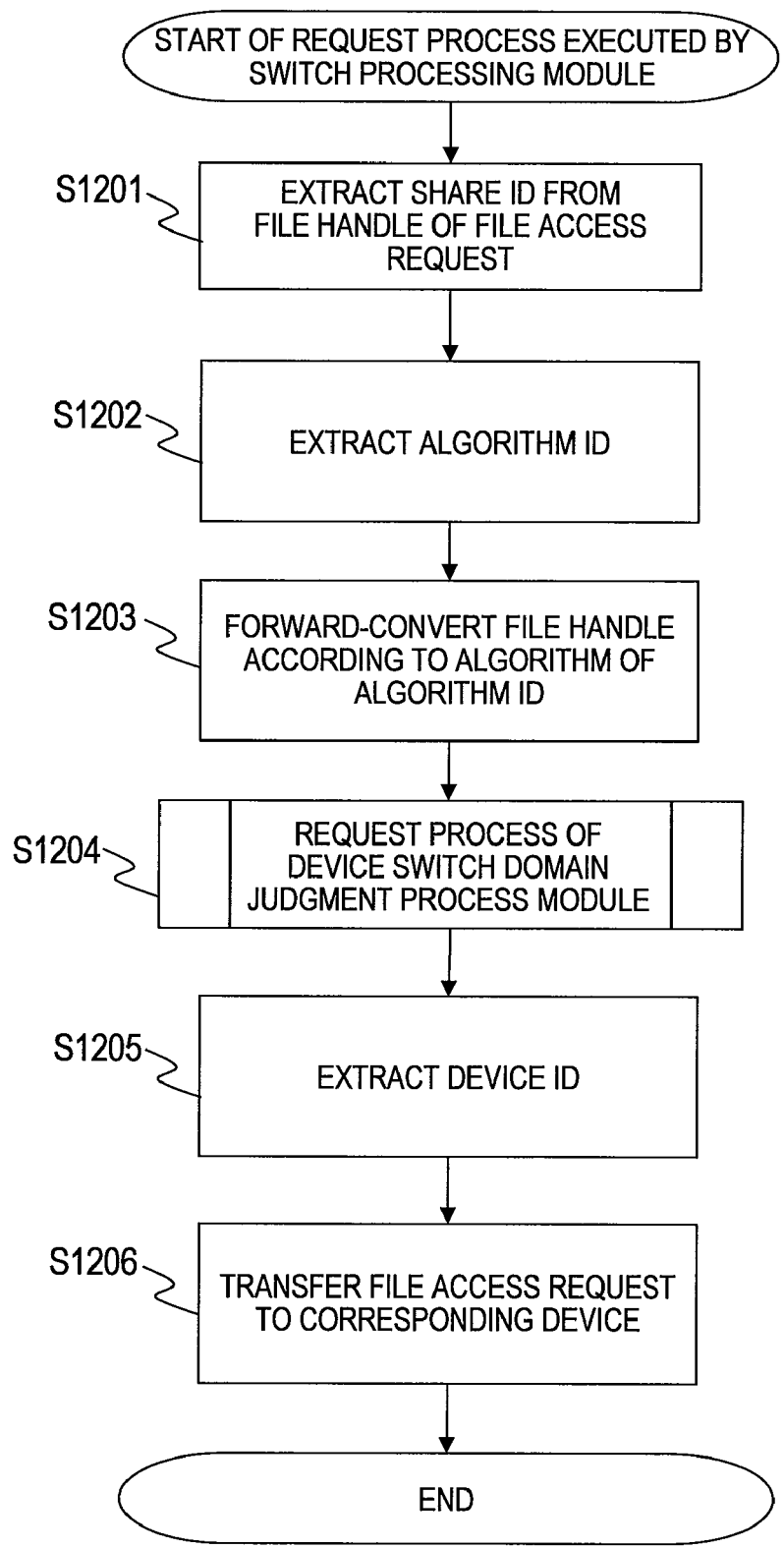
FIG. 30 is a flowchart of a request process executed by a switch processing module in accordance with the fifth embodiment of this invention.

FIG. 30 is a flowchart of the request process executed by the switch processing module 911 according to the fifth embodiment of this invention.

Upon reception of a file access request from the network file service processing module 302, the switch processing module 911 starts the request process.

First, the switch processing module 911 extracts a share ID from a file handle contained in the received file access request (S1201).

The switch processing module 911 selects a record where the extracted share ID matches the share ID 9021 of the switch management information 902 from the switch management information 902. Then, the switch processing module 911 extracts an algorithm ID 9023 from the selected record (S1202).

The switch processing module 911 forward-converts the file handle contained in the received file access request according to the algorithm identified by the extracted algorithm ID 9023 (S1203). The forward-converted file handle takes a format which the device of a request transfer target can understand.

The switch processing module 911 passes the file access request containing the converted file handle to the device switch domain judgment processing module 910. Upon reception of the file access request, the device switch domain judgment processing module 910 starts the request process (S1204).

Then, the switch processing module 911 receives the file access request from the device switch domain judgment processing module 910. The switch processing module 911 extracts a device ID 9022 from the record selected from the switch management information 902 in the step S1202 (S1205).

The switch processing module 911 transfers the file access request to the device (NAS 102 or root node 800) identified by the extracted device ID 9022 via the network file service processing module 302 (S1206).

The switch processing module 911 finishes the request process.

If the device identified by the extracted device ID 9022 is the root node 800 including the switch processing module 911, the switch processing module 911 passes the received file access request to the local file system processing module 304.

Figure 31:
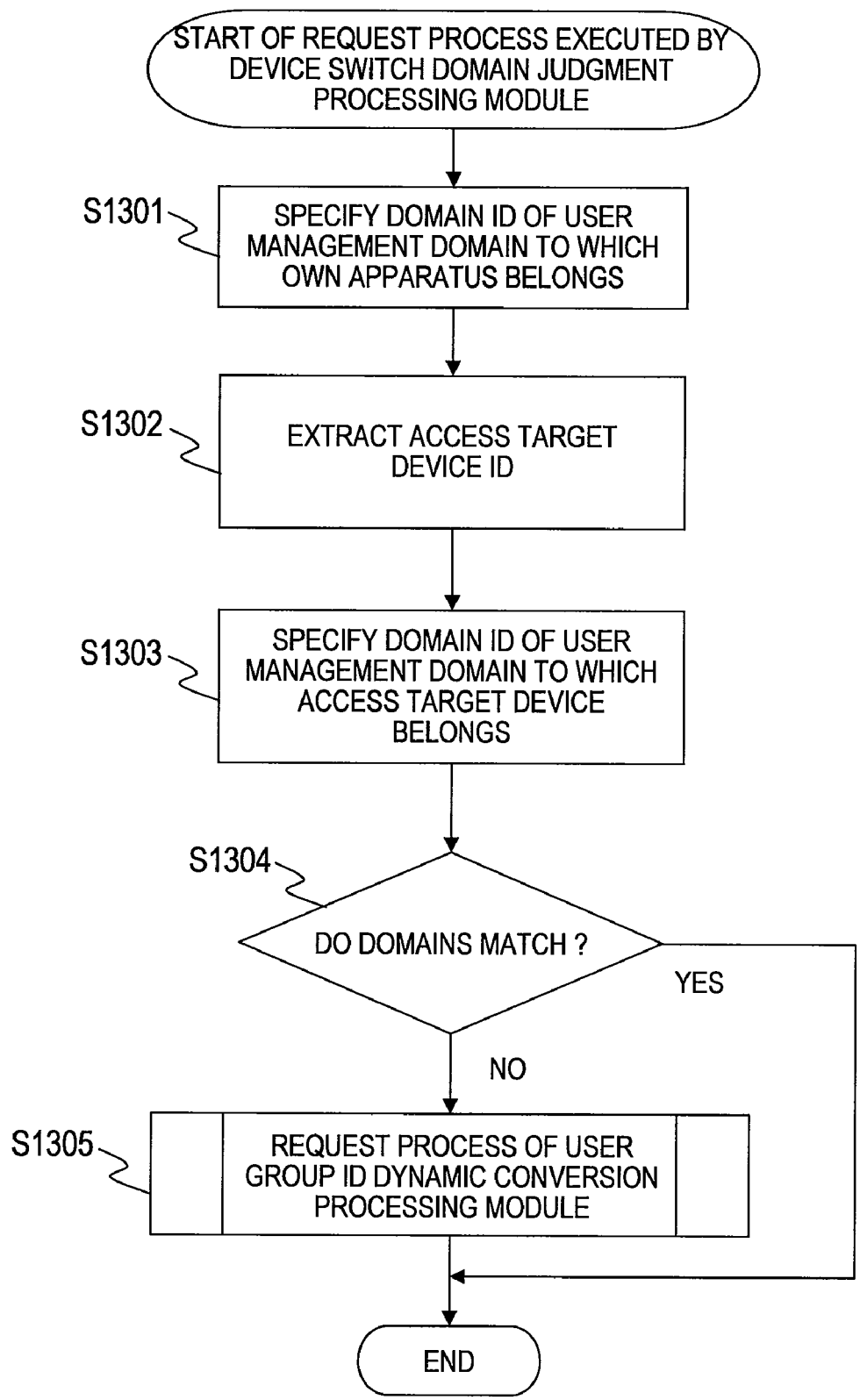
FIG. 31 is a flowchart of a request process executed by a device switch domain judgment processing module in accordance with the fifth embodiment of this invention.

FIG. 31 is a flowchart of the request process executed by the device switch domain judgment processing module 910 according to the fifth embodiment of this invention.

Upon reception of a file access request from the switch processing module 911, the device switch domain judgment processing module 910 starts the request process.

First, the device switch domain judgment processing module 910 selects a record where an identifier of the root node 800 including the device switch domain judgment processing module 901 matches the device ID 9031 of the device domain information 903 from the device domain information 903. Then, the device switch domain judgment processing module 910 extracts a domain ID 9032 from the selected record.

The device switch domain judgment processing module 910 specifies a user management domain 105 identified by the extracted domain ID 9032 as a user management domain 105 to which the root node 800 including the device switch domain judgment processing module 910 belongs (S1301).

The device switch domain judgment processing module 910 extracts a share ID from a file handle contained in the received file access request. The device switch domain judgment processing module 910 selects a record where the extracted share ID matches the share ID 9021 of the switch management information 902 from the switch management information 902. The device switch domain judgment processing module 910 extracts a device ID 9022 from the selected record (S1302).

The device switch domain judgment processing module 910 selects a record where the extracted device ID 9022 matches the device ID 9031 of the device domain information 903 from the device domain information 903. Then, the device switch domain judgment processing module 910 extracts a domain ID 9032 from the selected record.

The device switch domain judgment processing module 910 specifies a user management domain 105 identified by the extracted domain ID 9032 as a user management domain 105 to which an access target device of the file access request belongs (S1303).

The device switch domain judgment processing module 910 judges whether the domain ID 9032 extracted in the step S1301 matches the domain ID 9032 extracted in the step S1303 (S1304).

If the two domain IDs match each other, the user management domain 105 to which the root node 800 including the device switch domain judgment processing module 910 belongs is identical to the user management domain 105 to which the access target device of the file access request belongs. Accordingly, the device switch domain judgment processing module 910 returns the received file access request to the switch processing module 911. Then, the device switch domain judgment processing module 910 starts the request process.

On the other hand, if the two domain IDs do not match each other, the user management domain 105 to which the root node 800 including the device switch domain judgment processing module 910 belongs is different from the user management domain 105 to which the access target device of the file access request belongs. Accordingly, the device switch domain judgment processing module 910 passes the received file access request to the user group ID dynamic processing module 411.

Subsequently, upon reception of the file access request from the user group ID dynamic conversion processing module 411, the device switch domain judgment processing module 910 passes the received file access request to the switch processing module 911. Then, the device switch domain judgment processing module 910 finishes the request process.

Figure 32:
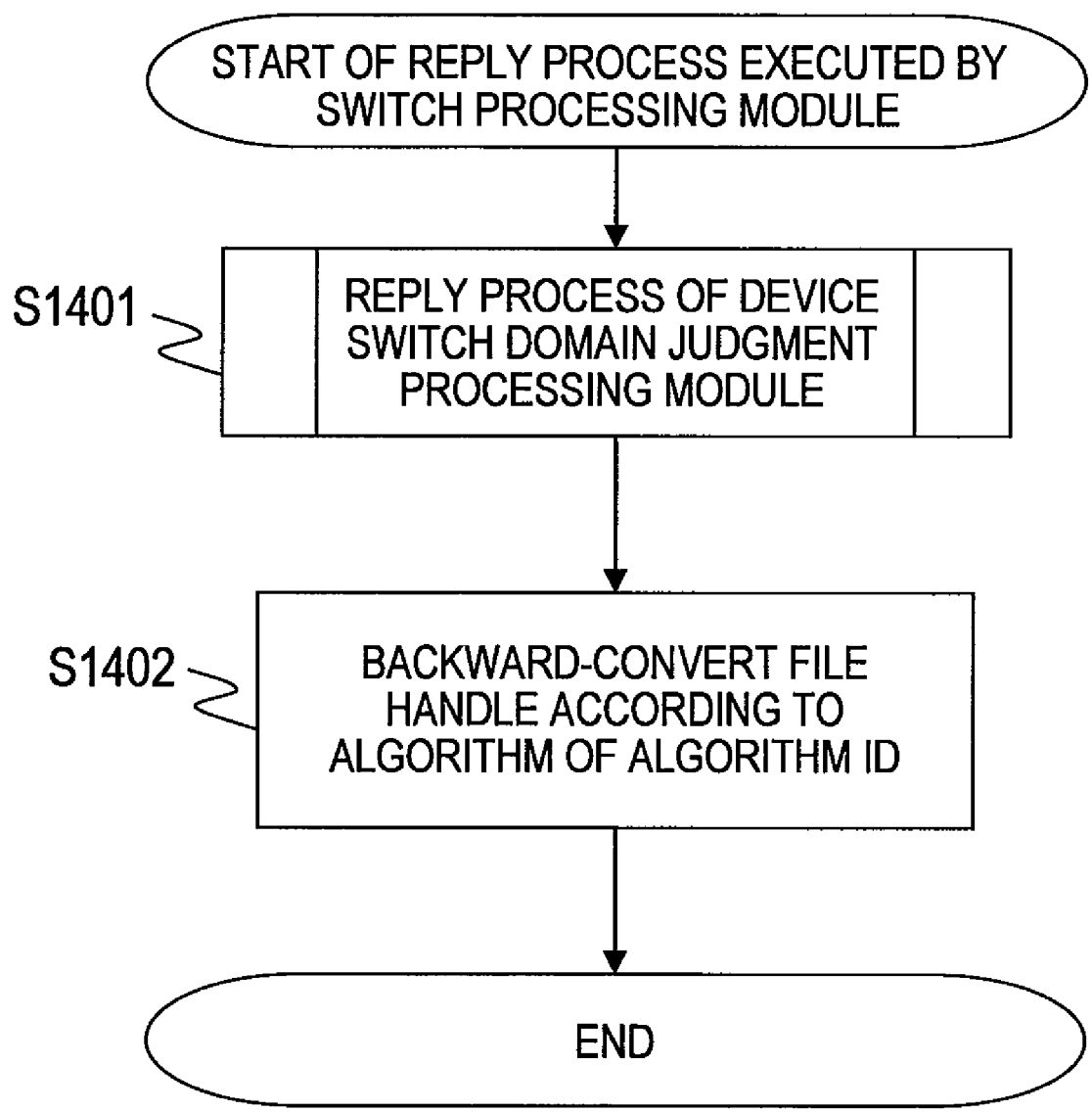
FIG. 32 is a flowchart of a reply process executed by the switch processing module in accordance with the fifth embodiment of this invention.

FIG. 32 is a flowchart of the reply process executed by the switch processing module 911 according to the fifth embodiment of this invention.

Upon reception of a reply to the file access request from the network file service processing module 302, the switch processing module 911 starts the reply process.

First, the switch processing module 911 passes the received reply to the device switch domain judgment processing module 910. Upon reception of the reply, the device switch domain judgment processing module 910 starts the reply process (S1401).

The switch processing module 911 receives the reply from the device switch domain judgment processing module 910. Then, the switch processing module 911 extracts a share ID from the received reply.

The switch processing module 911 selects a record where the extracted share ID matches the share ID 9021 of the switch management information 902 from the switch management information 902. Then, the switch processing module 911 extracts an algorithm ID 9023 from the selected record.

The switch processing module 911 backward-converts a file handle contained in the received reply according to the algorithm identified by the extracted algorithm ID 9023 (S1402). The backward-converted file handle takes a format which the client computer 100 can understand.

The switch processing module 911 transfers the reply to a transmission source client computer 100 of the file access request via the network file service processing module 302. Then, the switch processing module 911 finishes the reply process.

Figure 33:
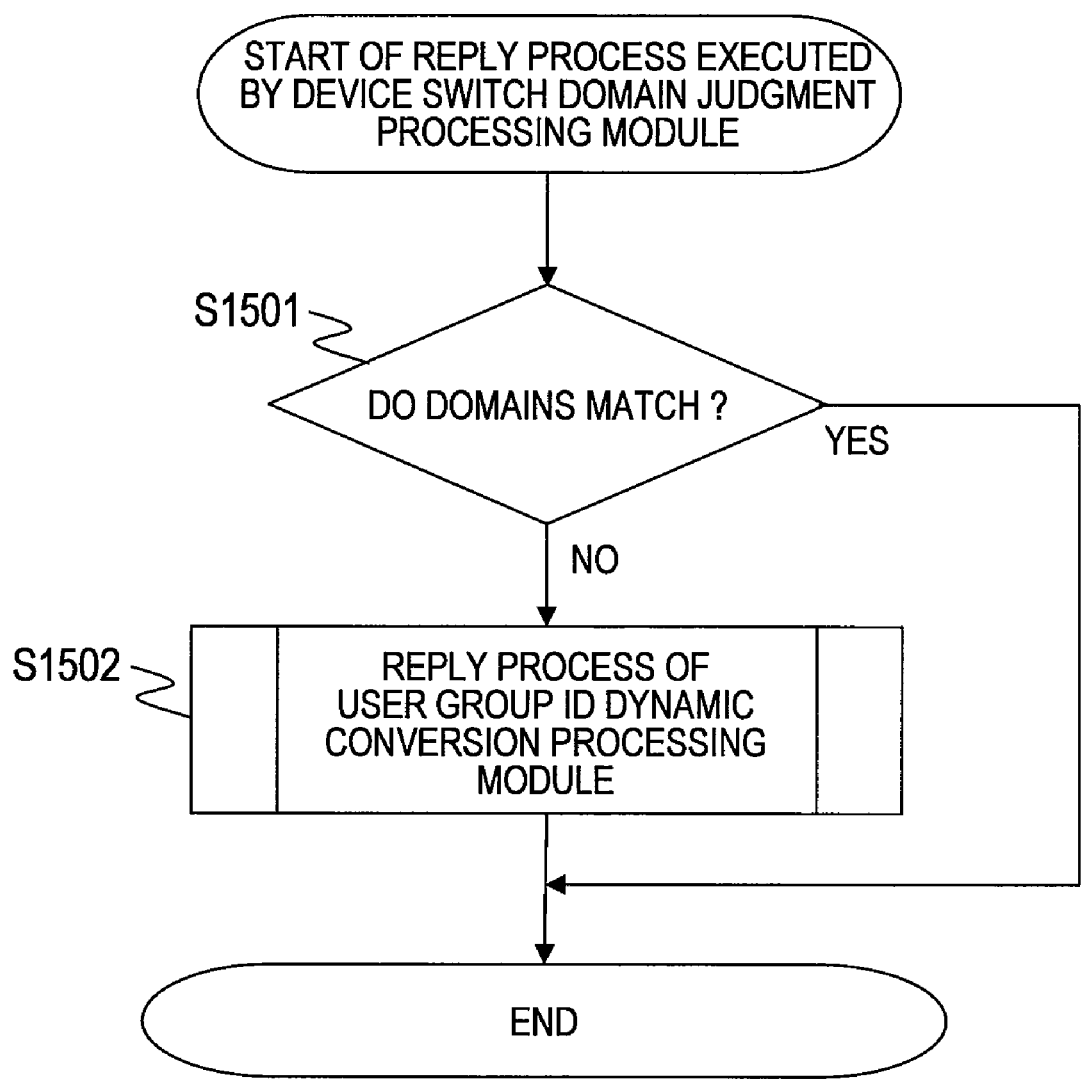
FIG. 33 is a flowchart of a reply process executed by a device switch domain judgment processing module in accordance with the fifth embodiment of this invention.

FIG. 33 is a flowchart of the reply process executed by the device switch domain judgment processing module 910 according to the fifth embodiment of this invention.

Upon reception of the reply from the switch processing module 911, the device switch domain judgment processing module 910 starts the reply process.

First, the device switch domain judgment processing module 910 selects a record where an identifier of the root node 800 including the device switch domain judgment processing module 910 matches the device ID 9031 of the device domain information 903 from the device domain information 903.

Then, the device switch domain judgment processing module 910 extracts a domain ID 9032 from the selected record.

The device switch domain judgment processing module 910 specifies a user management domain 105 identified by the extracted domain ID 9032 as a user management domain 105 to which the root node 800 including the device switch domain judgment processing module 910 belongs.

The device switch domain judgment processing module 910 extracts a share ID from the received reply. The device switch domain judgment processing module 910 selects a record where the extracted share ID matches the share ID 9021 of the switch management information 902 from the switch management information 902. The device switch domain judgment processing module 910 extracts a device ID 9022 from the selected record.

The device switch domain judgment processing module 910 selects a record where the extracted device ID 9022 matches the device ID 9031 of the device domain information 903 from the device domain information 903. Then, the device switch domain judgment processing module 910 extracts a domain ID 9032 from the selected record.

The device switch domain judgment processing module 910 specifies a user management domain 105 identified by the extracted domain ID 9032 as a user management domain 105 to which an access target device belongs.

The device switch domain judgment processing module 910 judges whether the domain ID 9032 extracted in the step S1301 matches the domain ID 9032 extracted in the step S1303 (S1501).

If the two domain IDs match each other, the device switch domain judgment processing module 910 returns the received reply to the switch processing module 911. Then, the device switch domain judgment processing module 910 starts the reply process.

On the other hand, if the two domain IDs do not match each other, the device switch domain judgment processing module 910 passes the received reply to the user group ID dynamic processing module 411 (S1502).

Subsequently, upon reception of the reply from the user group ID dynamic conversion processing module 411, the device switch domain judgment processing module 910 passes the received reply to the switch processing module 911. Then, the device switch domain judgment processing module 910 finishes the reply process.

Thus, according to the fifth embodiment of this invention, data migration at the time of integration is unnecessary.

While the present invention has been described in detail and pictorially in the accompanying drawings, the present invention is not limited to such detail but covers various obvious modifications and equivalent arrangements, which fall within the purview of the appended claims.

What is claimed is:

1. A computer apparatus for integrating at least two or more services of user management domains which are user management units, comprising:
    a processor;
    a memory; and
    an interface,
    wherein the processor is configured to:
    receive an access request;
    specify a user management domain to which a request source of the received access request belongs as an access source domain;
    specify a user management domain to which an access target of the received access request belongs as an access target domain;
    judge whether the specified access source domain matches the specified access target domain;
    execute a process according to the received access request, in the case of which the access source domain matches the access target domain;
    extract a user ID of the specified access source domain from the received access request, in the case of which the access source domain is different from the access target domain;
    refer to ID conversion information indicating correspondence of user IDs between the user management domains whose services are integrated in order to convert the extracted user ID of the access source domain into a user ID of the specified access target domain;
    substitute the user ID included in the received access request with the converted user ID; and
    execute a process according to the user ID substituted access request, wherein:
    the ID conversion information further indicates correspondence of group IDs between the user management domains whose services are integrated; and
    the processor is further configured to:
    extract a group ID of the specified access source domain from the received access request, in the case of which the access source domain is different from the access target domain;
    refer to the ID conversion information to convert the extracted group ID of the access source domain into a group ID of the specified access target domain;
    substitute the group ID included in the received access request with the converted group ID; and
    execute a process according to the user ID and group ID substituted access request.

2. The computer apparatus according to claim 1, wherein:
    the services to be integrated are file share services; and
    the access request is a file access request.

3. The computer apparatus according to claim 1, wherein the processor is further configured to:
    judge whether a user ID of the specified access target domain corresponding to the extracted user ID of the access source domain has been registered in the ID conversion information, in the case of converting the user ID;
    convert the extracted user ID of the access source domain into the registered user ID of the access target domain, in the case of which the user ID has been registered in the ID conversion information;
    specify an unused user ID of the specified access target domain, in the case of which the user ID has not been registered in the ID conversion information;
    convert the extracted user ID of the access source domain into the unused user ID of the specified access target domain; and
    register correspondence between the extracted user ID of the access source domain and the unused user ID of the specified access target domain in the ID conversion information.

4. The computer apparatus according to claim 3, wherein the processor is further configured to:
    judge whether the received access request concerns a process for updating an access target user ID, in the case of registering the correspondence between the extracted user ID of the access source domain and the unused user ID of the specified access target domain in the ID conversion information;
    register the correspondence between the extracted user ID of the access source domain and the unused user ID of the specified access target domain as permanent information in the ID conversion information, in the case of which the received access request concerns the process for updating the access target user ID; and register the correspondence between the extracted user ID of the access source domain and the unused user ID of the specified access target domain as temporary information in the ID conversion information in the case of which the received access request does not concern the process for updating the access target user ID.

5. The computer apparatus according to claim 3, wherein the processor is further configured to:

obtain a user ID used in the user management domain from a management computer which manages the user management domain; and specify an unused user ID of the user management domain based on the obtained used user ID.

6. The computer apparatus according to claim 1, wherein the processor is further configured to:

specify the access source domain based on one of information regarding connection between the request source of the received access request and the computer apparatus, IP address information of the request source of the received access request, and information regarding a network port of the computer apparatus; and specify the access target domain based on one of an access target directory path included in the received access request, information regarding an access target file system of the received access request, and information regarding an apparatus which manages an access target file of the access request.

7. The computer apparatus according to claim 1, wherein the processor is further configured to:

extract the user ID of the specified access target domain from a result with respect to the received access request, in the case of which the access source domain is different from the access target domain;

refer to the ID conversion information in order to convert the extracted user ID of the access target domain into the user ID of the specified access source domain; and transmit a result including the converted user ID to the request source of the received access request.

8. The computer apparatus according to claim 7, wherein:

the ID conversion information further indicates correspondence of group IDs between the user management domains whose services are integrated; and the processor is further configured to:

extract a group ID of the specified access target domain from a result with respect to the received access request, in the case of which the access source domain is different from the access target domain;

refer to the ID conversion information to convert the extracted group ID of the access target domain into a group ID of the specified access source domain; and transmit a result containing the converted user ID and the converted group ID to the request source of the received access request.

9. The computer apparatus according to claim 7, wherein the processor is further configured to:

judge whether a user ID of the specified access source domain corresponding to the extracted user ID of the access target domain has been registered in the ID conversion information, in the case of converting the user ID;

convert the extracted user ID of the access target domain into the registered user ID of the access source domain, in the case of which the user ID has been registered in the ID conversion information;

specify an unused user ID of the specified access source domain, in the case of which the user ID has not been registered in the ID conversion information;

convert the extracted user ID of the access target domain into the specified unused user ID of the access source domain; and register correspondence between the extracted user ID of the access target domain and the specified unused user ID of the access source domain in the ID conversion information.

10. A computer system comprising:

a plurality of client computers belonging to user management domains which are user management units; and a server apparatus for integrating at least two or more services of the user management domains, wherein the server apparatus comprises a processor, a memory and an interface, wherein the server apparatus is configured to:

receive an access request from one of the plurality of client computers;

specify a user management domain to which the client computer of a request source of the received access request belongs as an access source domain;

specify a user management domain to which an access target of the received access request belongs as an access target domain;

judge whether the specified access source domain matches the specified access target domain;

execute a process according to the received access request, in the case of which the access source domain matches the access target domain;

extract a user ID of the specified access source domain from the received access request, in the case of which the access source domain is different from the access target domain;

refer to ID conversion information indicating correspondence of user IDs between the user management domains whose services are integrated in order to convert the extracted user ID of the access source domain into a user ID of the specified access target domain;

substitute the user ID included in the received access request with the converted user ID; and execute a process according to the user ID substituted access request, wherein:

the ID conversion information further indicates correspondence of group IDs between the user management domains whose services are integrated; and the server apparatus is further configured to:

extract a group ID of the specified access source domain from the received access request, in the case of which the access source domain is different from the access target domain;

refer to the ID conversion information to convert the extracted group ID of the access source domain into a group ID of the specified access target domain;

substitute the group ID included in the received access request with the converted group ID; and execute a process according to the user ID and group ID substituted access request.

11. The computer system according to claim 10, wherein:
the services to be integrated are file share services; and
the access request is a file access request.

12. The computer system according to claim 10, wherein the server apparatus is further configured to:
- judge whether a user ID of the specified access target domain corresponding to the extracted user ID of the access source domain has been registered in the ID conversion information, in the case of converting the user ID;
- convert the extracted user ID of the access source domain into the registered user ID of the access target domain, in the case of which the user ID has been registered in the ID conversion information;
- specify an unused user ID of the specified access target domain, in the case of which the user ID has not been registered in the ID conversion information;
- convert the extracted user ID of the access source domain into the unused user ID of the specified access target domain; and
- register correspondence between the extracted user ID of the access source domain and the unused user ID of the specified access target domain in the ID conversion information.

13. The computer system according to claim 12, wherein the server apparatus is further configured to:
- judge whether the received access request concerns a process for updating an access target user ID, in the case of registering the correspondence between the extracted user ID of the access source domain and the unused user ID of the specified access target domain in the ID conversion information;
- register the correspondence between the extracted user ID of the access source domain and the unused user ID of the specified access target domain as permanent information in the ID conversion information, in the case of which the received access request concerns the process for updating the access target user ID; and
- register the correspondence between the extracted user ID of the access source domain and the unused user ID of the specified access target domain as temporary information in the ID conversion information, in the case of which the received access request does not concern the process for updating the access target user ID.

14. The computer system according to claim 12, further comprising a management computer for managing the user management domain,
- wherein the server apparatus is further configured to:
- obtain a user ID used in the user management domain from the management computer; and
- specify an unused user ID of the user management domain based on the obtained used user ID.

15. The computer system according to claim 10, wherein the server apparatus is further configured to:
- specify the access source domain based on one of information regarding connection between the client computer of the request source of the received access request and the server apparatus, IP address information of the client computer of the request source of the received access request, and information regarding a network port of the server apparatus; and
- specify the access target domain based on one of an access target directory path included in the received access request, information regarding an access target file system of the received access request, and information regarding an apparatus which manages an access target file of the access request.

16. The computer system according to claim 10, wherein the server apparatus is further configured to:
- extract the user ID of the specified access target domain from a result with respect to the received access request, in the case of which the access source domain is different from the access target domain;
- refer to the ID conversion information in order to convert the extracted user ID of the access target domain into the user ID of the specified access source domain; and
- transmit a result including the converted user ID to the client computer of the request source of the received access request.

17. The computer system according to claim 16,
- wherein the ID conversion information further indicates correspondence of group IDs between the user management domains whose services are integrated, and
- wherein the server apparatus is further configured to:
- extract a group ID of the specified access target domain from a result with respect to the received access request, in the case of which the access source domain is different from the access target domain;
- refer to the ID conversion information to convert the extracted group ID of the access target domain into a group ID of the specified access source domain; and
- transmit a result containing the converted user ID and the converted group ID to the client computer of the request source of the received access request.

18. The computer system according to claim 16, wherein the server apparatus is further configured to:
- judge whether a user ID of the specified access source domain corresponding to the extracted user ID of the access target domain has been registered in the ID conversion information, in the case of converting the user ID;
- convert the extracted user ID of the access target domain into the registered user ID of the access source domain, in the case of which the user ID has been registered in the ID conversion information;
- specify an unused user ID of the specified access source domain, in the case of which the user ID has not been registered in the ID conversion information;
- convert the extracted user ID of the access target domain into the specified unused user ID of the access source domain; and
- register correspondence between the extracted user ID of the access target domain and the specified unused user ID of the access source domain in the ID conversion information.

* * * * *